US012218865B2

United States Patent
Zhao et al.

(10) Patent No.: US 12,218,865 B2
(45) Date of Patent: Feb. 4, 2025

(54) METHOD FOR DETERMINING TRANSPORT BLOCK SIZE FOR SIDELINK TRANSMISSION AND TERMINAL DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 392 days.

(21) Appl. No.: 17/688,501

(22) Filed: Mar. 7, 2022

(65) Prior Publication Data
US 2022/0190983 A1 Jun. 16, 2022

Related U.S. Application Data

(63) Continuation of application No. PCT/CN2020/090674, filed on May 15, 2020.

(30) Foreign Application Priority Data

Sep. 30, 2019 (WO) ................ PCT/CN2019/109410
Feb. 1, 2020 (WO) ................ PCT/CN2020/074149
Feb. 20, 2020 (WO) ................ PCT/CN2020/076071

(51) Int. Cl.
*H04L 5/00* (2006.01)

(52) U.S. Cl.
CPC .......... *H04L 5/0042* (2013.01); *H04L 5/0051* (2013.01)

(58) Field of Classification Search
CPC ... H04L 5/0042; H04L 5/0051; H04L 1/0007; H04L 5/001; H04L 5/0044; H04L 5/0048;
(Continued)

(56) References Cited

U.S. PATENT DOCUMENTS

| 2016/0095114 A1 | 3/2016 | Kim et al. |
| 2017/0094657 A1* | 3/2017 | Yoon ..................... H04L 5/0012 |

(Continued)

FOREIGN PATENT DOCUMENTS

| CN | 107277922 A | 10/2017 |
| CN | 107438973 A | 12/2017 |

(Continued)

OTHER PUBLICATIONS

Chinese First Office Action with English Translation for CN Application 202210199464.4, mailed Apr. 5, 2023. (20 pages).

(Continued)

*Primary Examiner* — Ian N Moore
*Assistant Examiner* — Latresa A McCallum
(74) *Attorney, Agent, or Firm* — Young Basile Hanlon & MacFarlane, P.C.

(57) ABSTRACT

A method for data transmission and a terminal device are provided. The method includes the following. A terminal device determines number of resource elements (REs) for a physical sidelink shared channel (PSSCH) in a second resource according to a first resource used for transmitting a physical sidelink control channel (PSCCH) and the second resource indicated by the PSCCH and used for transmitting the PSSCH, where the first resource at least partially overlaps with the second resource. The terminal device determines a TBS for the PSSCH according to the number of the REs for the PSSCH.

20 Claims, 6 Drawing Sheets

(58) Field of Classification Search
CPC ...... H04L 5/0053; H04W 16/00; H04W 4/40; H04W 72/02; H04W 72/0446; H04W 72/0453; H04W 72/1263; H04W 72/20; H04W 72/23; H04W 76/14; H04W 92/18
See application file for complete search history.

(56) References Cited

U.S. PATENT DOCUMENTS

| | | | |
|---|---|---|---|
| 2018/0359707 A1* | 12/2018 | Chae | H04W 52/383 |
| 2019/0045390 A1 | 2/2019 | Davydov et al. | |
| 2019/0053267 A1 | 2/2019 | Kim et al. | |
| 2019/0159197 A1 | 5/2019 | Shrestha et al. | |
| 2019/0182859 A1 | 6/2019 | Khoryaev et al. | |
| 2019/0208387 A1* | 7/2019 | Jiang | H04W 4/46 |
| 2019/0223046 A1 | 7/2019 | Lee et al. | |
| 2019/0239203 A1 | 8/2019 | Chae | |
| 2019/0254091 A1 | 8/2019 | Kim et al. | |
| 2019/0364585 A1 | 11/2019 | Lee et al. | |
| 2020/0383114 A1* | 12/2020 | Zhang | H04W 72/0446 |

FOREIGN PATENT DOCUMENTS

| | | | |
|---|---|---|---|
| CN | 107666681 A | 2/2018 | |
| CN | 108632782 A | 10/2018 | |
| CN | 109565361 A | 4/2019 | |
| CN | 110035445 A | 7/2019 | |
| CN | 110166168 A | 8/2019 | |
| EP | 3544358 A1 | 9/2019 | |
| RU | 2698668 C1 | 8/2019 | |
| WO | 2017196159 A2 | 11/2017 | |
| WO | WO-2017196397 A1 * | 11/2017 | ........ H04W 72/0406 |
| WO | 2018135905 A1 | 7/2018 | |
| WO | 2018174688 A1 | 9/2018 | |
| WO | 2019134370 A1 | 7/2019 | |
| WO | 2019157739 A1 | 8/2019 | |
| WO | 2019168051 A1 | 9/2019 | |

OTHER PUBLICATIONS

Russian Office Action with English Translation for RU Application 20222108914/07, mailed Apr. 13, 2023. (12 pages).
Extended European Search Report for EP Application 23183996.0 mailed Oct. 26, 2023. (8 pages).
Indian First Examination Report for IN Application 202217011156 mailed Sep. 4, 2023. (6 pages).
Notice of Reasons for Refusal issued in corresponding JP Application No. JP2022-516452 dated Jan. 19, 2024, 7 pages (with English translation).
MediaTek Inc., "Discussion on sidelink physical layer structure", 3GPP TSG RAN WG1 #98 R1-1908396, Prague, Czech, Aug. 26-30, 2019, 19 pages.
CATT, "Physical layer structure for NR sidelink", 3GPP TSG RAN WG1 Meeting #98, R1-1908579, Prague, CZ, Aug. 26-30, 2019, 18 pages.
OPPO, "Physical layer procedure for NR-V2X", 3GPP TSG RAN WG1 Ad-Hoc Meeting 1901, R1-1900301, Taipei, Jan. 21-25, 2019, 10 pages.
Invitation to respond to written opinion issued in corresponding SG Application No. 11202202619R dated Mar. 8, 2024, 12 pages.
Extended European Search Report for EP Application 20870744.8 mailed Sep. 9, 2022. (7 pages).
International Search Report with English Translation for PCT Application PCT/CN2019/109410 mailed Jul. 1, 2020. (12 pages).
International Search Report with English Translation for PCT Application PCT/CN2020/074149 mailed Jun. 30, 2020. (13 pages).
International Search Report with English Translation for PCT Application PCT/CN2020/076071 mailed Apr. 22, 2020. (15 pages).
International Search Report with English Translation for PCT Application PCT/CN2020/090674 mailed Aug. 4, 2020. (16 pages).
3GPP TSG-RAN1 Meeting #94 Gothenburg, Sweden, R1-1810021, CR to 38.214 capturing the RAN1#94 meeting agreements, Nokia, Aug. 20-24, 2018. (92 pages).
3GPP TSG RAN WG1 #96bis MeetingXi'an, China, R1-1904072, Physical layer structure for NR sidelink, vivo, Apr. 8-12, 2019. (13 pages).
3GPP TSG RAN WG1 #96bis Meeting Xi'an, China, R1-1905632, Feature lead summary for agenda item 7.2.4.1 Physical layer structure for sidelink, Samsung, Apr. 8-12, 2019. (19 pages).
3GPP TSG RAN WG1 #97 Reno, USA, R1-1906402 Discussion on physical layer structure for sidelink in NR V2X, Panasonic, May 13-17, 2019. (6 pages).
3GPP TSG RAN WG1 #97 Reno, USA, R1-1907012, Discussion on physical layer structure for NR sidelink, LG Electronics, May 13-17, 2019. (25 pages).
3GPP TSG RAN WG1 Meeting #97Reno, USA, R1-1907269, Qualcomm Incorporated, Considerations on Physical Layer aspects of NR V2X, May 13-17, 2019. (15 pages).
3GPP TSG RAN WG1 Meeting #97 Reno, USA, R1-1907906, Intel Corporation, Sidelink Physical Structure for NR V2X Communication, May 13-17, 2019. (21 pages).
3GPP TSG RAN WG1 Meeting #98 Prague, Czech Republic, R1-1908633, Intel Corporation, Physical Structure for NR V2X, Aug. 26-30, 2019. (24 pages).
3GPP TSG RAN WG1 Meeting #100bis-eE-meeting, R1-2001550, Huawei, HiSilicon, Remaining details of sidelink physical layer structure, Apr. 20-Apr. 30, 2020. (27 pages).
3GPP TSG RAN WG1 #100bis-e e-Meeting, R1-2001577, Remaining issues of NR sidelink physical layer structure, ZTE, Sanechips, Apr. 20-30, 2020. (10 pages).
3GPP TSG RAN WG1 Meeting #100bis e-Meeting, R1-2001884, LG Electronics, Discussion on physical layer structure for NR sidelink, Apr. 20-30, 2020. (39 pages).
3GPP TSG RAN WG1 Meeting #100bis-E e-Meeting, R1-2001992, Intel Corporation, Solutions to remaining opens of physical structure for NR V2X sidelink design, Apr. 20-Apr. 30, 2020. (18 pages).
3GPP TSG RAN WG1 #100bis-e e-Meeting, R1-2002232, Ericsson, Physical layer structure for NR sidelink, Apr. 20-30, 2020. (9 pages).
3GPP TSG RAN WG1 #100bis e-Meeting, R1-2002265, Spreadtrum Communications, Remaining issues of physical ayer structure for sidelink, Apr. 20-30, 2020. (8 pages).
3GPP TSG RAN WG1 #100bis e-Meeting, R1-2002323, Apple, On Remaining Details of NR V2X Physical Layer Structure, Apr. 20-30, 2020. (10 pages).
3GPP TSG RAN WG1 #100bis e-Meeting, R1-2002361, NEC, Remaining issues on physical layer structure, Apr. 20-30, 2020. (5 pages).
3GPP TSG RAN WG1 #100bise-Meeting, R1-2002437, NTT Docomo, Inc., Remaining issues on sidelink physical layer structure, Apr. 20-30, 2020. (14 pages).
3GPP TSG RAN WG1 Meeting #100bis-e R1-2002537, Qualcomm Incorporated, Considerations on Physical Layer aspects of NR V2X, Apr. 20-Apr. 30, 2020. (18 pages).
3GPP TSG RAN WG1 #100b e-Meeting, R1-2002627, Mitsubishi Electric, Remaining issues of V2X PHY layer structure, Apr. 20-30, 2020. (5 pages).
3GPP TS 38.212 V16.0.0 (Dec. 2019), Multiplexing and channel coding (Release 16). (152 pages).
3GPP TS 38.214 V15.14.0 (Sep. 2021), Physical layer procedures for data (Release 15). (105 pages).
R1-2001659, Remaining issues on physical layer structure for NR sidelink, mailed Apr. 10, 2019.
Request for the Submission of an Opinion and English translation, issued in corresponding KR Application No. 10-2022-7009354, dated Sep. 4, 2024, 13 pages.

* cited by examiner

METHOD FOR DETERMINING TRANSPORT BLOCK SIZE FOR SIDELINK TRANSMISSION AND TERMINAL DEVICE

CROSS-REFERENCE TO RELATED APPLICATION(S)

This application is a continuation of International Application No. PCT/CN2020/090674, filed on May 15, 2020, which claims priority to International Application No. PCT/CN2019/109410, filed on Sep. 30, 2019, International Application No. PCT/CN2020/074149, filed on Feb. 1, 2020, and International Application No. PCT/CN2020/076071, filed on Feb. 20, 2020, the disclosure of all of which are hereby incorporated by reference in their entireties.

TECHNICAL FIELD

Implementations of the disclosure relates to the technical field of communication, and in particular to a method for data transmission and a terminal device.

BACKGROUND

The Internet of vehicles (IoV) or vehicle to everything (V2X) communication is a sidelink (SL) transmission technology based on device to device (D2D) communication. Unlike the conventional long term evolution (LTE) system in which data is received or transmitted through a base station, the IoV system adopts a terminal-to-terminal direct communication mode, thus having higher spectrum efficiency and lower transmission latency. In transmission of a data channel, SL transmission performance can be effectively improved by adopting a suitable transport block size (TBS). Therefore, how to accurately determine a TBS for a data channel in SL transmission has become a problem to be solved.

SUMMARY

A method for data transmission and a terminal device is provided in the disclosure.

According to a first aspect, a method for data transmission is provided. The method includes the following. A terminal device determines number of resource elements (REs) for a physical sidelink shared channel (PSSCH) in a second resource according to a first resource used for transmitting a physical sidelink control channel (PSCCH) and the second resource indicated by the PSCCH and used for transmitting the PSSCH, where the first resource at least partially overlaps with the second resource. The terminal device determines a TBS for the PSSCH according to the number of the REs for the PSSCH.

According to a second aspect, a terminal device is provided. The terminal device includes a processor and a memory storing a computer program. The computer program is executed by the processor to cause the terminal device to: determine number of resource elements (REs) for a physical sidelink shared channel (PSSCH) in a second resource according to a first resource used for transmitting a physical sidelink control channel (PSCCH) and the second resource indicated by the PSCCH and used for transmitting the PSSCH, where the first resource at least partially overlaps with the second resource; and determine a TBS for the PSSCH according to the number of the REs for the PSSCH.

DETAILED DESCRIPTION

Technical solutions in implementations of the disclosure will be described below with reference to the accompanying drawings.

The technical solutions in implementations of the disclosure is applicable to various communication systems, for example, a global system of mobile communication (GSM), a code division multiple access (CDMA) system, a wideband code division multiple access (WCDMA) system, a long term evolution (LTE) system, an LTE frequency division duplex (FDD) system, an LTE time division duplex (TDD) system, an advanced LTE (LTE-A) system, a new radio (NR) system, an evolved system of the NR system, an LTE-based access to unlicensed spectrum (LTE-U) system, a NR-based access to unlicensed spectrum (NR-U) system, a universal mobile telecommunication system (UMTS), a wireless local area networks (WLAN), a wireless fidelity (WiFi), a 5th generation (5G) system, or other communication systems.

Generally, the related communication system supports a limited number of connections and therefore is easy to implement. However, with development of the communication technology, the mobile communication system not only supports conventional communication, but also supports, for example, device to device (D2D) communication, machine to machine (M2M) communication, machine type communication (MTC), vehicle to vehicle (V2V) communication. Implementations of the disclosure also can be applied to these communication systems.

Additionally, a communication system in implementations of the disclosure is applicable to a carrier aggregation (CA) scenario, a dual connectivity (DC) scenario, a standalone (SA) layout scenario, or the like.

Figure 1:
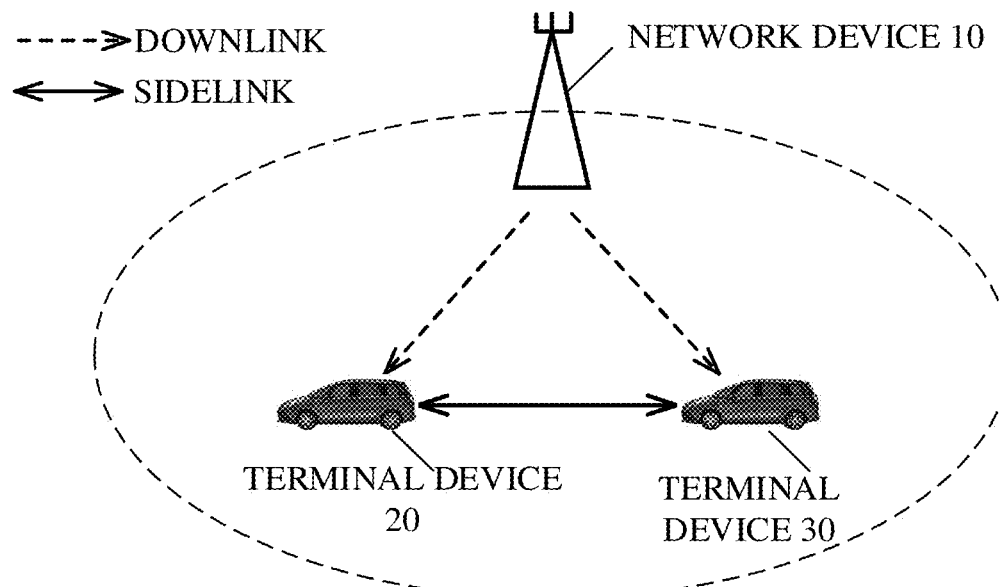
FIG. 1 is a schematic diagram illustrating a wireless communication system applied to implementations of the disclosure.
Figure 2:
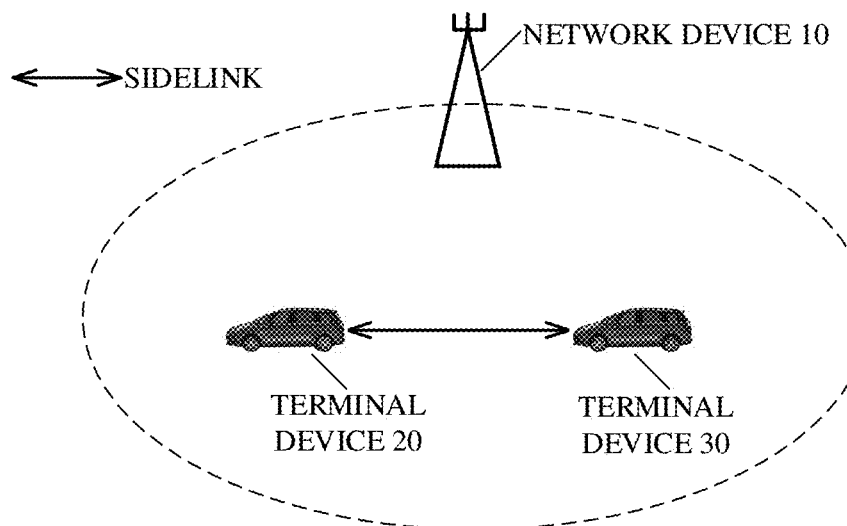
FIG. 2 is a schematic architecture diagram illustrating another application scenario in implementations of the disclosure.

For example, as illustrated in FIG. 1 and FIG. 2, the communication system 100 applied to implementations of the disclosure includes a network device 10. The network device 10 may be a device that can communicate with a terminal device. The network device 10 can provide a communication coverage for a specific geographical area and communicate with a terminal device located in the coverage area.

In implementations of the disclosure, for example, the network device 10 may be a base transceiver station (BTS) in the GSM or CDMA system, a nodeb (NB) in the WCDMA system, an evolutional node b (eNB or eNodeB) in the LTE system, or a radio controller in a cloud radio access network (CRAN). Alternatively, the network device 10 may be a mobile switching center, a relay station, an access point (AP), an in-vehicle device, a wearable device, a hub, a switch, a bridge, a router, a network device in a 5G network, a network device in a future evolved public land mobile network (PLMN), or the like. Alternatively, the network device 110 also may be a satellite in a national telecommunication network (NTN) system.

The communication system 100 may also include at least one terminal device located in a coverage range of the network device 10, such as a terminal device 20 and a terminal device 30. The terminal device may be mobile or fixed. Alternatively, the terminal device may refer to a user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device may also be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in the future 5G network, a terminal device in a future evolved public land mobile network (PLMN), etc., which will not be limited herein.

D2D communication can be performed between the terminal device 20 and the terminal device 30. In D2D communication, the terminal device 20 can directly communicate with the terminal device 30 through a D2D link, i.e., a sidelink (SL). For example, in implementations illustrated in FIG. 1 or FIG. 2, the terminal device 20 directly communicates with the terminal device 30 through an SL. In FIG. 1, the terminal device 20 communicates with the terminal device 30 through an SL, where transmission resources for the terminal devices are allocated by the network device. In FIG. 2, the terminal device 20 communicates with the terminal device 30 through an SL, where transmission resources for the terminal devices are autonomously selected by the terminal device 20 and the terminal device 30, such that there is no need for the network device to allocate the transmission resources.

FIG. 1 and FIG. 2 illustrate a network device and two terminal devices, which will not be limited herein. The communication system 100 may include multiple network devices, and there can be other numbers of terminal devices in a coverage range of each of the network devices. In addition, the communication system 100 may further include other network entities such as a network controller, a mobile management entity, or the like.

In implementations of the disclosure, D2D communication may refer to V2V communication or vehicle to everything (V2X) communication. In V2X communication, X may broadly refer to any device with wireless receiving and transmitting functions, for example but not limited to a slow-moving wireless device, a fast-moving in-vehicle device, a network control node with wireless transmitting and receiving functions, or the like. It can be understood that, implementations of the disclosure are mainly applied to a V2X communication scenario, but also may be applied to any other D2D communication scenarios, which will not be limited herein.

The terminal device above can adopt two transmission modes to perform SL transmission, i.e., a first mode and a second mode. In the first mode, the transmission resource for the terminal device is allocated by the network device. The terminal device performs data transmission on the SL according to the resource allocated by the network device. The network device can allocate a resource for single transmission to the terminal device and also can allocate a resource for semi-static transmission to the terminal device. In LTE-V2X, the first mode is called mode 3. In the second mode, the terminal device selects from a resource pool a resource for data transmission. In LTE-V2X, the second mode is called mode 4.

In NR-V2X, autonomous driving may be supported. Therefore, a higher request for data interaction between vehicles is required, for example, higher throughput, lower latency, higher reliability, a greater coverage range, or a more flexible resource allocation. Likewise, two transmission modes are introduced in NR-V2X, i.e., mode 1 and mode 2. In mode 1, the network device allocates a transmission resource to the terminal device, which corresponds to the first mode above. In mode 2, the terminal device autonomously selects a transmission resource, which corresponds to the second mode above.

In mode 1, a resource allocation manner of configured grant (CG) is supported in SL transmission, i.e., the network device allocates an SL transmission resource to the terminal device through CG. When the terminal device is allocated with the transmission resource through CG, the terminal device can transmit SL data on the transmission resource, so that the terminal device has no need to transmit signaling such as a scheduling request (SR) or a buffer status report (BSR) to the network device for resource application, thereby decreasing transmission latency.

In addition, in mode 1, a dynamic allocation for transmission resources is also supported. When the terminal device needs to transmit SL data, the terminal device sends a request to the network device, and the network device allocates an SL transmission resource to the terminal device through downlink control information (DCI), so that the terminal device transmits the SL data on the transmission resource.

In mode 2, the terminal device autonomously selects a transmission resource from a resource pool allocated by the network device or a pre-configured resource pool. The terminal device can obtain an available resource set in the resource pool through sensing. When the terminal device selects a transmission resource for data transmission from the resource set, for a periodic transmission service, the terminal device can reserve a transmission resource for next transmission, thereby avoiding that the resource is preempted by other users. For an aperiodic transmission service, the terminal device may not reserve a transmission resource.

Figure 3:
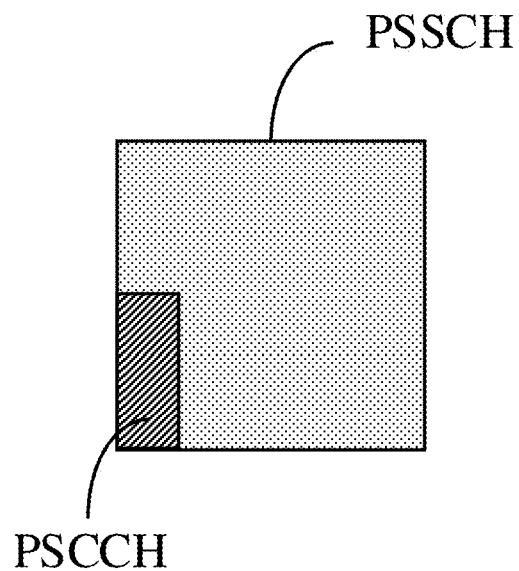
FIG. 3 is a schematic diagram illustrating overlapping of transmission resources for a physical sidelink control channel (PSCCH) and a physical sidelink shared channel (PSSCH).

In NR-V2X, a control channel and a data channel can be transmitted through multiplexing resources. For example, in implementations illustrated in FIG. 3, a resource for the control channel and a resource for the data channel overlap. In implementations illustrated in FIG. 3, a resource for a physical sidelink control channel (PSCCH) is embedded into that for a physical sidelink shared channel (PSSCH), and the PSCCH and the PSSCH have the same frequency-domain start position or frequency-domain end position. Generally, a transmission resource for the PSSCH has a length of a slot, where a last time-domain symbol is used as a guard period (GP), and the GP is not used for data transmission. The PSCCH occupies several time-domain symbols at front in the slot. Therefore, a receive device can decode the PSCCH after the symbols for the PSCCH are received, instead of waiting for reception of data in a complete slot before decoding the PSCCH, thereby decreasing transmission latency.

Figure 4:
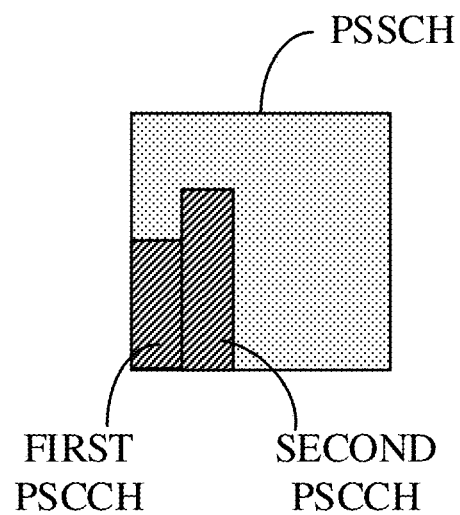
FIG. 4 is a schematic diagram illustrating a first PSCCH and a second PSCCH.

Furthermore, for example, in implementations illustrated in FIG. 4, second order control information can be adopted in NR-V2X, i.e., a control channel includes a first PSCCH and a second PSCCH. The first PSCCH can indicate information that is used for the receive device to perform resource sensing, such as a transmission resource for the PSSCH, priority information of a service carried in the PSSCH, or information of a reserved resource. The second PSCCH indicates information used for demodulating the PSSCH, such as a modulation and coding scheme (MCS), number of transmission layers, a hybrid automatic repeat request (HARQ) process number, a new data indicator (NDI), or related identifiers (IDs) of a transmit device and the receive device. Further, the first PSCCH further can indicate information that is used for determining information of a transmission resource for the second PSCCH.

A size of a time-domain or frequency-domain resource for the first PSCCH is pre-configured or configured by the network device. As for different resource pools, time-domain or frequency-domain resources of different sizes can be configured for the first PSCCH. For example, resource pool configuration information includes indication information used for determining a size of a transmission resource for the first PSCCH, so that the size of the transmission resource used for transmitting the first PSCCH can be determined according to the indication information. Furthermore, the first PSCCH can indicate the information used for determining the transmission resource for the second PSCCH, so that a size of the transmission resource for the second PSCCH can be determined according to the first PSCCH.

Figure 5:
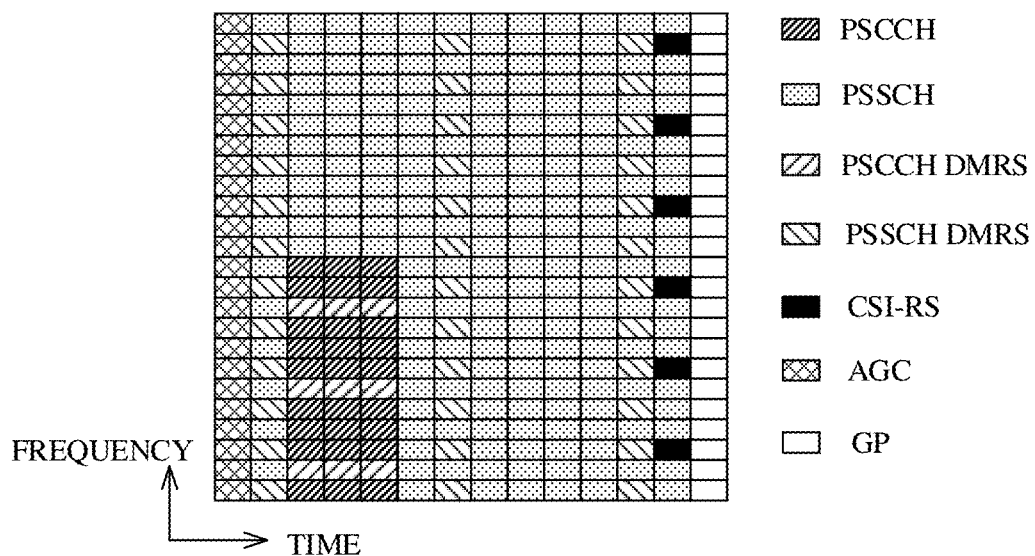
FIG. 5 is a schematic diagram illustrating a usage of each resource in a slot.

For example, in implementations illustrated in FIG. 5, in a slot, the PSCCH and the PSSCH can be transmitted through multiplexing resources. Generally, a first symbol in the slot is used for the receive device to perform automatic gain control (AGC), and data on the symbol is not used for data demodulation. A last symbol in the slot is used as the GP and used for receive-transmit conversion or transmit-receive conversion, and the GP is not used for data transmission.

Figure 6:
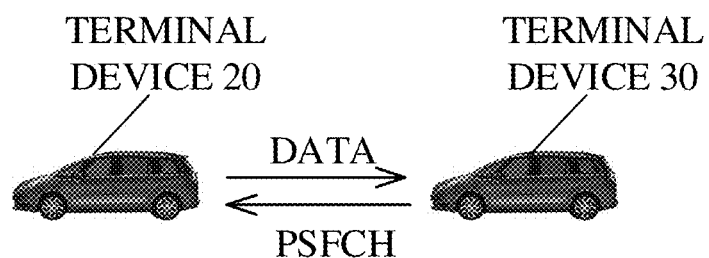
FIG. 6 is a schematic diagram illustrating a sidelink (SL) feedback between terminal devices.

In addition, in order to improve transmission reliability, a physical sidelink feedback channel (PSFCH) is introduced into the SL. For example, in implementations illustrated in FIG. 6, the terminal device 20 and the terminal device 30 constitute a unicast link. The terminal device 20 transmits SL data to the terminal device 30. The terminal device 30 transmits the PSFCH to the terminal device 20 according to a detection result of the received SL data, where the PSFCH carries feedback information, i.e., HARQ acknowledgement (ACK) or negative ACK (NACK). The terminal device 20 receives the feedback information transmitted by the terminal device 30, and determines whether to retransmit the data to the terminal device 30 according to the feedback information.

Figure 7:
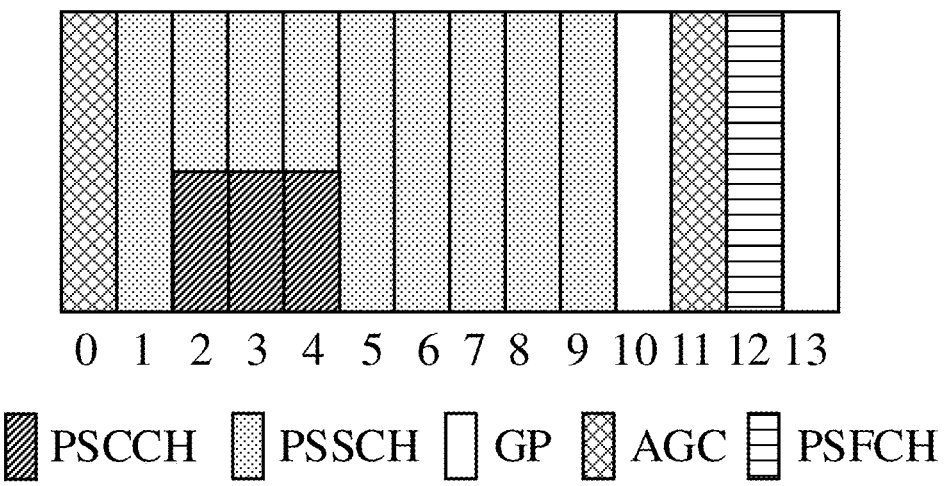
FIG. 7 is a schematic diagram illustrating a transmission resource for an SL feedback channel.

In implementations illustrated in FIG. 7, the PSFCH occupies two time-domain symbols, i.e., the PSFCH occupies symbol 11 and symbol 12 in a slot, where symbol 11 can be used for the AGC. A last time-domain symbol in the slot, i.e., symbol 13, can be used as a GP, and a GP exists between the PSFCH and the PSSCH. Reference signals not illustrated in FIG. 7 may include a demodulation reference signal (DMRS) of the PSCCH, a DMRS of the PSSCH, a channel state information-reference signal (CSI-RS), and the like.

In SL transmission, the terminal device may determine a suitable transport block size (TBS), thereby transmitting a transport block of a suitable size through a PSSCH. In implementations of the disclosure, a method for data transmission is provided, which can accurately determine a TBS and be applicable for a case where multiplexing resource is adopted for a control channel and a data channel in SL transmission.

Figure 8:
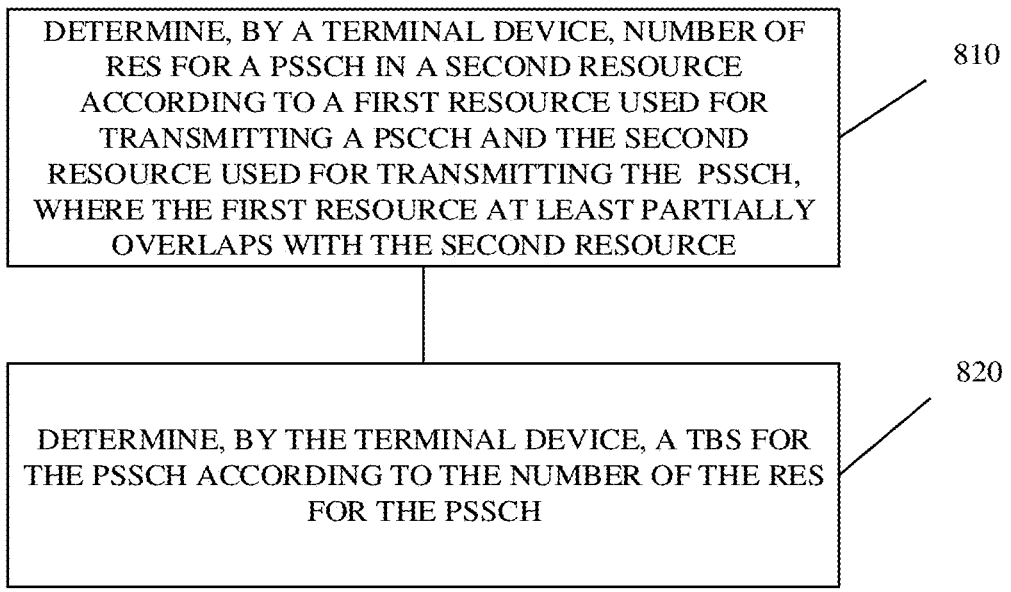
FIG. 8 is a schematic flow chart illustrating a method for data transmission in implementations of the disclosure.

FIG. 8 is a schematic flow chart illustrating a method for data transmission in implementations of the disclosure. The method 800 illustrated in FIG. 8 is performed by a terminal device, such as the terminal device 20 or the terminal device 30 illustrated in FIG. 1 to FIG. 7. In implementations illustrated in FIG. 8, the method includes all or a part of operations below.

At 810, the terminal device determines number of resource elements (REs) for a PSSCH in a second resource according to a first resource used for transmitting a PSCCH and the second resource used for transmitting a PSSCH.

Alternatively, the first resource at least partially overlaps with the second resource.

At 820, the terminal device determines a TBS for the PSSCH according to the number of the REs for the PSSCH.

In SL transmission, a transmit device transmits the PSCCH to a receive device, and sidelink control information (SCI) in the PSCCH is used to indicate a second resource allocated to the PSSCH. In this implementation, the first resource used for transmitting the PSCCH at least partially overlaps with the second resource used for transmitting the PSSCH, such as implementations illustrated in FIG. 3 or FIG. 4. In this case, when the terminal device determines the number of the REs for the PSSCH, the terminal device may consider not only the second resource, but also the first resource, thereby accurately obtaining the number of the REs. Then the terminal device can determine the TBS for the PSSCH according to the number of the REs for the PSSCH.

The PSCCH includes a first PSCCH and a second PSCCH. The first PSCCH can be used to indicate information used for resource sensing and first information, where the first information is used for determining the second PSCCH. The second PSCCH is used to indicate information used for demodulating the PSSCH.

The first resource may include a first sub-resource and a second sub-resource, where the first sub-resource is used for transmitting the first PSCCH and the second sub-resource is used for transmitting the second PSCCH.

For example, the first sub-resource can be determined according to resource pool configuration information. The resource pool configuration information is used to indicate a resource pool that can be used by the terminal device to perform SL transmission, and carries indication information. The indication information is used for determining a size of the first sub-resource. For example, the indication information may include at least one of: number of time-domain symbols occupied by the first PSCCH, a position of a start time-domain symbol occupied by the first PSCCH, number of sub-bands occupied by the first PSCCH, or a size of a sub-band. The terminal device can determine the first sub-resource used for transmitting the first PSCCH in response to reception of the resource pool configuration information.

The second sub-resource can be determined according to the first PSCCH. The first PSCCH can include the first information. For example, the first information may include at least one of: a format of the second PSCCH, an aggregation level of the second PSCCH, a size of a frequency-domain resource occupied by the second PSCCH, number of time-domain symbols occupied by the second PSCCH, a modulation order of the second PSCCH, a coding rate of the second PSCCH, number of information bits of the SCI carried in the second PSCCH, or number of coded bits of the SCI carried in the second PSCCH.

For example, the terminal device can determine a size of a resource occupied by the second PSCCH according to the size of the frequency-domain resource occupied by the second PSCCH and the number of time-domain symbols occupied by the second PSCCH. For another example, the terminal device can determine a corresponding control channel element (CCE) or RE group (REG) according to the aggregation level of the second PSCCH, and further determine the size of the resource occupied by the second PSCCH. For example, different formats of the second PSCCH correspond to different resources, and the terminal device can determine a corresponding resource for the second PSCCH according to a format indicated by the first PSCCH. For another example, different formats of the second PSCCH correspond to number of information bits of different control information, and the size of the resource occupied by the second PSCCH can be determined according to number of information bits corresponding to a format of the second PSCCH and an MCS for the second PSCCH.

The first PSCCH further can be used to indicate the information used for resource sensing. For example, the information includes at least one of: information of the second resource, priority information of a service carried in the PSSCH, or information of a reserved resource of the terminal device.

The second PSCCH indicates the information used for demodulating the PSSCH. For example, the information includes at least one of: an MCS, number of transmission layers, an HARQ process number, an NDI, or an ID.

The ID includes at least one of: an ID of the transmit device, an ID of the receive device, a group ID of the receive device, or a service ID corresponding to the PSSCH.

For unicast, the ID may be the ID of the transmit device and the ID of the receive device. For multicast, the ID may be the ID of the transmit device and the group ID of the receive device, i.e., an ID of a device group to which the receive device belongs. For broadcast, the ID may be the ID of the transmit device and a service ID of the transmit device, and only for a terminal device that is interested in a service of the service ID or a terminal device that needs to receive the service, the PSSCH may be received.

It can be understood that, the first resource used for transmitting the first PSCCH can totally or partially overlap with the second resource used for transmitting the second PSSCH. When the first resource totally overlaps with the second resource, the first resource can be located within a range of the second resource, i.e., the second resource includes the first resource, such as implementations illustrated in FIG. 3 and FIG. 4. Preferably, the first resource and the second resource have the same frequency-domain start position or frequency-domain end position. For another example, the first resource can partially overlap with the second resource, e.g., a transmission resource for the first PSCCH does not overlap with the second resource, but a transmission resource for the second PSCCH overlaps with the second resource. When the first resource overlaps with the second resource, an overlapped part is used for transmitting the PSCCH.

The method above can be performed by the receive device and also can be performed by the transmit device. That is, the terminal device above may be the transmit device or the receive device. The transmit device can transmit on the first resource the PSCCH to the receive device. Correspondingly, the receive device receives on the first resource the PSCCH, and determines the second resource according to the PSCCH.

The transmit device can determine the number of the REs for the PSSCH according to the first resource used for transmitting the PSCCH and the second resource used for transmitting the PSSCH, and determine the TBS for the PSSCH according to the number of the REs for the PSSCH. The transmit device transmits on the first resource the PSCCH to the receive device to indicate the second resource, and transmits on the second resource the PSSCH to the receive device based on the TBS.

The receive device receives on the first resource the PSCCH and determines the second resource. The receive device can determine the number of the REs for the PSSCH according to the first resource and the second resource, and determine the TBS for the PSSCH according to the number of the REs for the PSSCH, thereby receiving on the second resource the PSSCH based on the TBS.

In this implementation, the terminal device determines the number of the REs for the PSSCH in the second resource according to the first resource and the second resource. The REs for the second PSSCH are REs used for determining the TBS for the PSSCH.

For example, the REs for the second PSSCH may not include at least one of: REs in the first resource, REs occupied by an SL reference signal, REs unavailable for SL transmission, REs occupied by the PSFCH, REs used as GPs, or REs used for the AGC.

That is to say, the REs for the second PSSCH are REs used for transmitting the PSSCH except for REs occupied by an extra overhead such as a reference signal.

The REs for the PSSCH do not include the REs in the first resource.

That is to say, the terminal device may exclude REs occupied by the PSCCH in the second resource from REs in the second resource, i.e., exclude REs in the second resource that overlap the first resource.

Furthermore, the REs for the PSSCH may not include at least one of: REs occupied by an SL reference signal, REs unavailable for SL transmission, REs occupied by the PSFCH, REs used as GPs, or REs used for AGC.

There is no data on a time-domain symbol used as a GP. Although there is data on a time-domain symbol that is used for the AGC, the data is only used for the AGC and not used for data demodulation. The PSFCH carries the feedback information such as ACK/NACK, but does not carry data in the data channel. Therefore, the terminal device can exclude REs used as the GPs and used for the AGC, and REs occupied by the PSFCH from the REs in the second resource.

An SL reference signal is used for channel demodulation, estimation, and measurement, and does not carry data in a data channel. Therefore, the terminal device further can exclude the REs occupied by the SL reference signal from the REs in the second resource. For example, the SL reference signal includes the DMRS of the PSSCH, the SL CSI-RS, a phase tracking reference signal (PT-RS), and the like.

In addition, for carrier sharing, for example, when uplink (UL) transmission and SL transmission can share a carrier, a part of the second resource is used for transmitting SL data, and the other part of the second resource is used for transmitting UL data or downlink data and not used for transmitting the SL data. In this case, the terminal device needs to exclude REs unavailable for transmitting the SL data from the REs in the second resource.

The REs in the first resource include the REs occupied by the PSCCH, and further include REs occupied by the DMRS of the PSCCH. In this case, the terminal device does not need to exclude the REs occupied by the DMRS of the PSCCH from the REs in the second resource.

Generally, the PSSCH can occupy a slot, that is to say, the second resource includes a slot in a time domain, which will not be limited herein.

The following will illustrate a manner of determining $N_{RE}$ in detail through specific implementations.

In implementation one, the number of the REs ($N_{RE}$) for the PSSCH may satisfy $N_{RE}=\beta(N_{PRB} \times N_{SC}^{RB} \times N_{symb} - N_{PSCCH}^{RE} - N_{RS}^{RE} - N_{oh})$. $N_{PRB}$ represents number of physical resource blocks (PRBs) for the PSSCH. What needs to be specially illustrated is that, the PSCCH exists in some orthogonal frequency division multiplexing (OFDM) symbols in a slot, and in the OFDM symbols number of PRBs that are used for transmitting the PSSCH is less than number of OFDM symbols that do not contain the PSCCH, so that $N_{PRB}$ represents number of PRBs that are used for transmitting the PSSCH and are in the OFDM symbols that do not contain the PSCCH. $N_{symb}$ represents number of time-domain symbols for the PSSCH, $N_{SC}^{RB}$ represents number of subcarriers in a PRB, $N_{PSCCH}^{RE}$ represents number of REs occupied by the PSCCH in the second resource, $N_{RS}^{RE}$ represents the number of the REs occupied by the SL reference signal, $N_{oh}$ and $\beta$ are preset parameters, and $0<\beta\leq1$.

These parameters will be respectively described below.

$N_{SC}^{RB}$ represents the number of the subcarriers in the PRB, $N_{symb}$ represents the number of the time-domain symbols for the PSSCH, $N_{PRB}$ represents the number of the PRBs for the PSSCH, therefore, $N_{PRB} \times N_{SC}^{RB} \times N_{symb}$ represents a total number of the REs in the second resource.

For example, for a normal cyclic prefix (CP), a slot includes 14 time-domain symbols, i.e., $N_{symb}=14$. For carrier sharing, number of symbols available for SL transmission in the slot may be less than 14, such as 7, i.e., $N_{symb}=7$. If a slot aggregation is considered, i.e., a PSSCH can be transmitted in multiple continuous slots, in this case, $N_{symb}>14$. For example, if the PSSCH is transmitted in two slots, $N_{symb}=28$.

For another example, considering that a first time-domain symbol in this slot is used for AGC and a last time-domain symbol in this slot is used as a GP, $N_{symb}=12$.

For another example, the first time-domain symbol in this slot is used for the AGC, the last time-domain symbol in this slot is used as the GP, the first time-domain symbol is still used for data transmission, but the last time-domain symbol is not used for data transmission, therefore, $N_{symb}=13$.

$N_{PSCCH}^{RE}$ represents the number of the REs occupied by the PSCCH in the second resource, where the REs occupied by the PSCCH include REs actually used for transmitting the PSCCH and REs used for transmitting the DMRS of the PSCCH. For determining the number of the REs for the PSSCH in the second resource, the number of the REs occupied by the PSCCH needs to be subtracted.

$N_{RS}^{RE}$ represents the number of the REs occupied by the SL reference signal. When determining the number of the REs for the PSSCH in the second resource, the REs occupied by the SL reference signal needs to be excluded, where the SL reference signal includes the DMRS of the PSSCH, the SL CSI-RE, the PT-RS, and the like.

$N_{oh}$ and $\beta$ are optional parameters and represent an extra resource overhead. For example, $N_{oh}$ and $\beta$ can be determined based on at least one of: the number of the REs occupied by the PSFCH, the number of the REs used as the GPs, the number of the REs used for the AGC, the number of the REs that are unavailable for SL transmission in the second resource, or the number of time-domain symbols that are unavailable for SL transmission in the second resource.

$N_{oh}$ and $\beta$ can be configured by the network device, such as carried in the resource pool configuration information, or be pre-configured, such as agreed by an agreement.

For example, if data mapping on the symbols used for the AGC and the time-domain symbols used as the GPs is performed in a comb mapping manner, $N_{oh}$ represents number of REs without mapped data in the time-domain symbols that are used for the AGC and used as the GPs, i.e., number of REs that are used for the AGC and used as the GPs in the time-domain symbols. In this case, $N_{symb}=14$.

For another example, $N_{oh}$ can represent the number of the REs occupied by the PSFCH.

For another example, considering the number of the REs occupied by the PSFCH, $N_{RE}$ is adjusted through $\beta$. Supposing the PSFCH occupies two time-domain symbols, such as implementations illustrated in FIG. 7, a former symbol of the two time-domain symbols is used for the AGC, and a latter symbol of the two time-domain symbols is used for carrying the feedback information. A GP is needed between the PSSCH and the PSFCH. Therefore, the existence of the PSFCH results in 3/14 of resource overheads, $\beta$ can be set to satisfy $\beta=1-3/14=0.8$. In this case, optionally, the PSFCH may not be considered for determining a value of $N_{oh}$.

For another example, for carrier sharing, the number of the symbols available for SL transmission in a slot may be less than 14, such as 7, in this case, $\beta$ can be set to satisfy $\beta=7/14=0.5$. In this case, the carrier sharing may not be considered for determining a value of $N_{symb}$, i.e., $N_{symb}=14$.

As for configuring values of $N_{symb}$, $N_{oh}$, and $\beta$, the resource overheads above may not be reconsidered, such as resource overheads for the PSFCH, the GPs, the AGC, and resource overheads unavailable for SL transmission.

In implementation two, the number of the REs ($N_{RE}$) for the PSSCH may satisfy $$N_{RE} = \sum_{l=0}^{N_{symbol}^{PSSCH}-1} M_{sc}^{SCI2}(l) - Q'_{SCI2}$$

where $$Q'_{SCI2} = \min\left\{ \left\lceil \frac{(O_{SCI2}+L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r} \right\rceil, \left\lceil \alpha \sum_{l=0}^{N_{symbol}^{PSSCH}-1} M_{sc}^{SCI2}(l) \right\rceil \right\} + \gamma$$

$O_{SCI2}$ represents number of bits carried in the second PSCCH, having the same meaning as 3GPP TS 38.212 V16.0.0, i.e., the number of SCI format 0-2 bits. $L_{SCI2}$ represents a length of cyclic redundancy check (CRC) bits for the second PSCCH, having the same meaning as 3GPP TS 38.212 V16.0.0. $\beta_{offset}^{SCI2}$ is indicated by the first PSCCH (i.e., SCI format 0-1) and represents a coding rate offset for the second PSCCH, having the same meaning as 3GPP TS 38.212 V16.0.0. $C_{SL-SCH}$ represents number of code blocks for a sidelink-shared channel (SL-SCH) presently carried in the PSSCH, having the same meaning as 3GPP TS 38.212 V16.0.0. l=0, 1, 2, $\cdots N_{symbol}^{PSSCH}-1$ represents an OFDM symbol index, $N_{symbol}^{PSSCH}$ represents number of OFDM symbols allocated for transmission of the PSSCH in a present slot, and the OFDM symbols do not include OFDM symbols used for the AGC, having the same meaning as 3GPP TS 38.212 V16.0.0. $M_{sc}^{PSSCH}(l)$ represents a scheduled bandwidth of the PSSCH in an OFDM symbol l and represents number of subcarriers, having the same meaning as 3GPP TS 38.212 V16.0.0. $M_{sc}^{DMRS}(l)$ represents number of subcarriers in the OFDM symbol l that are used for carrying a scheduled DMRS of the PSSCH, having the same meaning as 3GPP TS 38.212 V16.0.0. $M_{sc}^{PT-RS}(l)$ represents number of subcarriers in the OFDM symbol l that are used for carrying a scheduled PT-RS of the PSSCH, having the same meaning as 3GPP TS 38.212 V16.0.0. $M_{sc}^{SCI-RS}(l)$ represents number of subcarriers in the OFDM symbol l that are used for carrying a CSI-RS within the scheduled bandwidth of the PSSCH, having the same meaning as 3GPPTS 38.212 V16.0.0. $M_{sc}^{SCI2}(l)=M_{sc}^{PSSCH}(l)-M_{sc}^{DMRS}(l)-M_{sc}^{PT-RS}(l)-M_{sc}^{CSI-RS}(l)$, $M_{sc}^{SCI2}(l)$ represents number of subcarriers in the OFDM symbol l that are available for carrying the second PSCCH within the scheduled bandwidth of the PSSCH, having the same meaning as 3GPP TS 38.212 V16.0.0. γ represents number of vacant subcarriers in a PRB onto which a last modulation symbol of the second PSCCH is mapped, having the same meaning as 3GPP TS 38.212 V16.0.0. $K_r$ represents a size of an r-th code block for the SL-SCH presently carried in the PSSCH, having the same meaning as 3GPP TS 38.212 V16.0.0. α represents a scale factor configured by a high layer, having the same meaning as 3GPP TS 38.212 V16.0.0.

In implementation three, the number of the REs ($N_{RE}$) for the PSSCH may satisfy $$N_{RE}=N_{PRB} \times N_{SC}^{RB} \times N_{symb}^{PSSCH} - N_{RE}^{PSCCH1} - N_{RE}^{PSCCH2} - N_{SC}^{DMRS} - N_{oh}^{3}$$

$N_{PRB}$ represents number of PRBs for the PSSCH. What needs to be specially illustrated is that, the PSCCH exists in some OFDM symbols in a slot, and in these OFDM symbols number of PRBs that are used for transmitting the PSSCH is less than number of OFDM symbols that do not contain the PSCCH, so that $N_{PRB}$ represents number of PRBs that are used for transmitting the PSSCH in the OFDM symbols without the PSCCH. $N_{symbol}^{PSSCH}$ has the same meaning as the implementation two. $N_{SC}^{RB}$ represents number of subcarriers in a PRB. $N_{RE}^{PSCCH1}=F_{RB}^{PSCCH1} \times T_{symbol}^{PSCCH1} \times N_{SC}^{RB}$, $N_{RE}^{PSCCH1}$ represents number of REs used for transmitting a first PSCCH (i.e., the SCI format 0-1) that is associated with the PSSCH or indicates transmission of the PSSCH. $F_{RB}^{PSCCH1}$ represents number of PRBs used for transmitting the first PSCCH, $T_{symbol}^{PSCCH1}$ represents number of OFDM symbols used for transmitting the first PSCCH, and a UE can determine values of the two parameters above according to configured or pre-configured information of a current resource pool. $N_{RE}^{PSCCH1}$ represents number of REs that are used for demodulating the DMRS of the first PSCCH.

$N_{RE}^{PSCCH2}$ represents number of REs used for transmitting a second PSCCH (i.e., the SCI format 0-2) that is associated with the PSSCH or indicates transmission of the PSSCH. $N_{SC}^{DMRS}$ represents number of REs that are used for carrying the DMRS of the PSSCH.

In an implementation manner of the example, $N_{oh}^3$ may represent number of REs that are occupied by an SL CI-RS and an SL PT-RS transmitted by the terminal device in a range of time-domain and frequency-domain resources for the PSSCH.

In a second implementation manner of the example, $N_{oh}^3=N_{PRB} \times N_{oh}^{resourcepool}$, where $N_{oh}^{resourcepool}$ is indicated by the configured signaling or pre-configured signaling of the current resource pool.

In a third implementation manner of the example, if the terminal device transmits the SL CSI-RS in the range of the time-domain and frequency-domain resources for the PSSCH, $N_{oh}^3=N_{PRB} \times N_{oh,1}^{resourcepool}$, otherwise, $N_{oh}^3=N_{PRB} \times N_{oh,2}^{resourcepool}$, where $N_{oh,1}^{resourcepool}$ and $N_{oh,2}^{resourcepool}$ are indicated by the configured signaling or pre-configured signaling of the current resource pool.

Preferably, a position of an OFDM symbol occupied by the SL CSI-RS transmitted in the range of the time-domain and frequency-domain resources for the PSSCH is indicated by the configured signaling or pre-configured signaling of the resource pool, and a value range of an index of the OFDM symbol is [3, 13].

In implementation four, the number of the REs ($N_{RE}$) for the PSSCH may satisfy $$N_{RE}=F_{RB}^{PSCCH1} \times [(N_{symbol}^{PSSCH}-T_{symbol}^{PSCCH1}) \times N_{SC}^{RB}-N_{SC,1}^{DMRS,PRB}-N_{oh,1}^4]+(N_{PRB}-F_{RB}^{PSCCH1}) \times [N_{symbol}^{PSSCH} \times N_{SC}^{RB}-N_{SC,2}^{DMRS,PRB}-N_{oh,2}^4]-N_{RE}^{PSCCH2}$$

$N_{PRB}$, $N_{symbol}^{PSCCH1}$, $N_{SC}^{RB}$, $F_{RB}^{PSCCH1}$, $N_{RE}^{PSCCH2}$, and $T_{symbol}^{PSCCH1}$ each have the same meaning as the implementation three.

$N_{SC,1}^{DMRS,PRB}$ represents number of REs that are occupied by a DMRS of the PSSCH transmitted in a frequency-domain range for a first PSCCH associated with the PSSCH, and $N_{SC,2}^{DMRS,PRB}$ represents number of REs that are occupied by a DMRS of the PSSCH transmitted outside the frequency-domain range for the first PSCCH associated with the PSSCH.

$N_{oh,1}^4$ represents number of REs needed to be additionally excluded in each PRB in the frequency-domain range for the first PSCCH associated with the PSSCH, $N_{oh,2}^4$ represents number of REs needed to be additionally excluded in each PRB outside the frequency-domain range for the first PSCCH associated with the PSSCH, and the two parameters above are indicated by the configured signaling or pre-configured signaling of the current resource pool.

In implementation five, the number of the REs ($N_{RE}$) for the PSSCH may satisfy $$N_{RE}=F_{RB}^{PSCCH1} \times [(N_{symbol}^{PSSCH}-T_{symbol}^{PSCCH1}) \times N_{SC}^{RB}-N_{SC,1}^{DMRS,PRB}-N_{oh,1}^5]+(N_{PRB}-F_{RB}^{PSCCH1}) \times [N_{symbol}^{PSSCH} \times N_{SC}^{RB}-N_{SC,2}^{DMRS,PRB}-N_{oh,2}^5]$$

$N_{PRB}$, $N_{symbol}^{PSSCH}$, $N_{SC}^{RB}$, $F_{RB}^{PSCCH1}$, $N_{RE}^{PSCCH2}$, $N_{SC,1}^{DMRS,PRB}$, $N_{SC,2}^{DMRS,PRB}$, and $T_{symbol}^{PSCCH1}$ each have the same meaning as the implementation four.

$N_{oh,1}^5$ represents number of REs needed to be excluded in each PRB in the frequency-domain range for the first PSCCH associated with the PSSCH, $N_{oh,2}^5$ represents number of REs needed to be additionally excluded in each PRB outside the frequency-domain range for the first PSCCH associated with the PSSCH, and the two parameters above are indicated by the configured signaling or pre-configured signaling of the current resource pool. Optionally, the two parameters above may have the same value. Optionally, if the terminal device does not transmit the second PSCCH, values of the two parameters above each is 0. Optionally, if the current resource pool does not activate transmission of the PT-RS and the terminal device does not transmit the second PSCCH and the SL CSI-RS, values of the two parameters above each is 0.

In implementation six, the number of the REs ($N_{RE}$) for the PSSCH may satisfy $$N_{RE}=N_{PRB} \times N_{SC}^{RB} \times t_{symbol,6} - N_{RE}^{PSCCH1}$$

$N_{PRB}$ represents number of PRBs for the PSSCH, $N_{SC}^{RB}$ represents number of subcarriers in a PRB, and $N_{RE}^{PSCCH1}$ represents number of REs for a first PSCCH that indicates transmission of the PSSCH.

$N_{RE}^{PSCCH1} = F_{RB}^{PSCCH1} \times T_{symbol}^{PSCCH1} \times N_{SC}^{RB}$, $F_{RB}^{PSCCH1}$ represents number of PRBs used for transmitting the first PSCCH, and $T_{symbol}^{PSCCH1}$ represents number of OFDM symbols used for transmitting the first PSCCH.

$t_{symbol,6}$ represents number of reference OFDM symbols used for transmitting the PSSCH. Preferably, $t_{symbol,6}$ is a positive number, and $0 < t_{symbol,6} < 13$. Preferably, a value granularity of $t_{symbol,6}$ is 0.5.

In an implementation manner of the example, $t_{symbol,6}$ is determined by a physical layer of the transmit terminal according to a self-implementation manner, or determined by a high layer of the transmit terminal according to a self-implementation manner and indicated to the physical layer of the transmit terminal.

In another implementation manner of the example, $t_{symbol,6}$ is selected from a specific value range by the physical layer of the transmit terminal, and the specific value range is determined by configured signaling or pre-configured signaling.

In a further implementation manner of the example, the transmit terminal determines $t_{symbol,6}$ according to at least one of the following.

1. Number of OFDM symbols that are used for transmitting the PSSCH in a slot where a resource that is provided by the high layer of the terminal and is used for current transmission and/or retransmission of the PSSCH is located, where the OFDM symbols that are used for transmitting the PSSCH refer to any OFDM symbols containing REs that are available for transmitting the PSSCH, and the OFDM symbols that are used for transmitting the PSSCH do not include OFDM symbols used for the AGC.

2. Presently determined number of DMRS-OFDM symbols for the PSSCH, where the DMRS-OFDM symbols refer to any OFDM symbols containing the DMRS and do not include the OFDM symbols used for the AGC.

3. Presently determined number of REs occupied by PSCCH2.

4. Presently determined number of REs occupied by a CSI-RS and a PT-RS.

For example, $t_{symbol,6} = \text{round}(\tilde{N}_{symbol}^{PSSCH} - N_{symbol}^{DMRS}/2) - \text{round}((N_{RE}^{PSCCH2} - N_{SC}^{CSI-RS} = \tilde{N}_{SC}^{PT-RS})/N_{SC}^{RB}/N_{PRB})$, where symbol $\tilde{N}_{symbol}^{PSSCH}$ represents an average value of number of OFDM symbols available for transmission of the PSSCH on all resources that are used for new transmission and retransmission of the PSSCH, $N_{symbol}^{DMRS}$ represents number of DMRS-OFDM symbols for the PSSCH, $N_{RE}^{PSCCH2}$ represents number of REs that are used for carrying SCI format 0-2 in the REs for the PSSCH or number of reference REs that are configured by a high layer and used for carrying SCI format 0-2, $N_{SC}^{CSI-RS}$ represents number of REs that are used for carrying the CSI-RS in the REs for the PSSCH, $\tilde{N}_{SC}^{PT-RS}$ represents an average value of number of REs in each PRB that are used for carrying the PT-RS on all resources that are used for new transmission and retransmission of the PSSCH, and round represents a closest valid value.

The transmit terminal may directly or indirectly indicate a value of $t_{symbol,6}$ through a specific bit domain in the PSCCH2. Preferably, if the transmit terminal indirectly indicates the value of $t_{symbol,6}$, the value of $t_{symbol,6}$ can represent an offset relative to a specific reference value. The specific reference value may be number of OFDM symbols available for transmission of the PSSCH in a present PSSCH transmission slot, or number of OFDM symbols available for transmission of the PSSCH in a slot for that a present resource pool contains PSFCH resource configuration, or number of OFDM symbols available for transmission of the PSSCH in a slot for that the present resource pool does not contain the PSFCH resource configuration. In each transmission for the same transport block, the value of $t_{symbol,6}$ indicated in a corresponding PSCCH2 may be the same.

In implementation seven, the number of the REs ($N_{RE}$) for the PSSCH may satisfy $$N_{RE}=N_{PRB} \times N_{SC}^{RB} \times t_{symbol,7} - N_{RE}^{PSCCH1} - N_{PRB} \times N_{oh}^{7}$$

$N_{PRB}$ represents number of PRBs for the PSSCH, $N_{SC}^{RB}$ represents number of subcarriers in a PRB, and $N_{RE}^{PSCCH1}$ represents number of REs for a first PSCCH that indicates transmission of the PSSCH.

$N_{oh}^{7}$ represents a value configured by a high layer. Preferably, a value of $N_{OH}^{7}$ is related with number of REs occupied by the CSI-RS and PT-RS presently transmitted together with the PSSCH.

$t_{symbol,7}$ represents number of reference OFDM symbols used for transmitting the PSSCH. Preferably, $t_{symbol,7}$ is a positive number, and $0 < t_{symbol,7} < 13$. Preferably, a value granularity of $t_{symbol,7}$ is 0.5.

In an implementation manner of the example, $t_{symbol,7}$ is determined by the physical layer of the transmit terminal according to a self-implementation manner, or determined by the high layer of the transmit terminal according to a self-implementation manner and indicated to the physical layer of the transmit terminal.

In another implementation manner of the example, $t_{symbol,7}$ is selected from a specific value range by the physical layer of the transmit terminal, and the specific value range is determined by configured signaling or pre-configured signaling.

In a further implementation manner of the example, the transmit terminal determines $t_{symbol,7}$ according to at least one of the following.

1. Number of OFDM symbols that are used for transmitting the PSSCH in a slot where a resource that is provided by the high layer of the terminal and is used for current transmission and/or retransmission of the PSSCH is located, where the OFDM symbols that are used for transmitting the PSSCH refer to any OFDM symbols containing REs that are available for transmitting the PSSCH, and the OFDM symbols that are used for transmitting the PSSCH do not include OFDM symbols used for the AGC.

2. Presently determined number of DMRS-OFDM symbols for the PSSCH, where the DMRS-OFDM symbols refer to any OFDM symbols containing the DMRS and do not include the OFDM symbols used for the AGC.

3. Presently determined number of REs occupied by PSCCH2.

For example, $t_{symbol,7}$=round($\tilde{N}_{symbol}^{PSSCH}$-$N_{symbol}^{DMRS}$/2)-round($N_{SC}^{PSCCH2}$/$N_{SC}^{RB}$/$N_{PRB}$), where $\tilde{N}_{symbol}^{PSSCH}$ represents an average value of number of OFDM symbols available for transmission of the PSSCH on all resources that are used for new transmission and retransmission of the PSSCH, $N_{symbol}^{DMRS}$ represents number of DMRS-OFDM symbols for the PSSCH, $N_{RE}^{PSCCH2}$ represents number of actual REs that are used for carrying SCI format 0-2 in the REs for the PSSCH, or number of reference REs that are configured by a high layer and used for carrying SCI format 0-2.

The transmit terminal may directly or indirectly indicate a value of $t_{symbol,7}$ through a specific bit domain in the PSCCH2. Preferably, if the transmit terminal indirectly indicates the value of $t_{symbol,7}$, the value of $t_{symbol,7}$ can represent an offset relative to a specific reference value. The specific reference value may be number of OFDM symbols available for transmission of the PSSCH in a present PSSCH transmission slot, or number of OFDM symbols available for transmission of the PSSCH in a slot for that a present resource pool contains PSFCH resource configuration, or number of OFDM symbols available for transmission of the PSSCH in a slot for that the present resource pool does not contain the PSFCH resource configuration. In each transmission for the same transport block, the value of $t_{symbol,7}$ indicated in a corresponding PSCCH2 may be the same.

In implementation eight, the number of the REs ($N_{RE}$) for the PSSCH may satisfy $$N_{RE}=N_{PRB} \times N_{SC}^{RB} \times T_{symbol,8}-N_{RE}^{PSCCH1}-N_{RE}^{PSCCH2,ref}-N_{PRB} \times N_{oh}^{8}$$

$N_{PRB}$ represents number of PRBs for the PSSCH, $N_{SC}^{RB}$ represents number of subcarriers in a PRB, and $N_{RE}^{PSCCH1}$ represents number of REs for a first PSCCH that indicates transmission of the PSSCH.

$N_{oh}^{8}$ represents a value configured by a high layer. Preferably, a value of $N_{oh}^{8}$ is related with number of REs occupied by the CSI-RS and PT-RS presently transmitted together with the PSSCH. Optionally, $N_{oh}^{8}$ may be always 0.

$t_{symbol,8}$ represents number of reference OFDM symbols used for transmitting the PSSCH. Preferably, $t_{symbol,8}$ is a positive number, and 0<$t_{symbol,8}$<13. Preferably, a value granularity of $t_{symbol,8}$ is 0.5.

In an implementation manner of the example, $t_{symbol,8}$ is determined by the physical layer of the transmit terminal according to a self-implementation manner, or determined by the high layer of the transmit terminal according to a self-implementation manner and indicated to the physical layer of the transmit terminal.

In another implementation manner of the example, $t_{symbol,8}$ is selected from a specific value range by the physical layer of the transmit terminal, and the specific value range is determined by configured signaling or pre-configured signaling.

In a further implementation manner of the example, the transmit terminal determines $t_{symbol,8}$ according to at least one of the following.

1. Number of OFDM symbols that are used for transmitting the PSSCH in a slot where a resource that is provided by the high layer of the terminal and is used for current transmission and/or retransmission of the PSSCH is located, where the OFDM symbols that are used for transmitting the PSSCH refer to any OFDM symbols containing REs that are available for transmitting the PSSCH, and the OFDM symbols that are used for transmitting the PSSCH do not include OFDM symbols used for the AGC.

2. Presently determined number of DMRS-OFDM symbols for the PSSCH, where the DMRS-OFDM symbols refer to any OFDM symbols containing the DMRS and do not include the OFDM symbols used for the AGC.

For example, $t_{symbol,8}$=round($\tilde{N}_{symbol}^{PSSCH}$-$N_{symbol}^{DMRS}$/2), where $\tilde{N}_{symbol}^{PSSCH}$ represents an average value of number of OFDM symbols available for transmission of the PSSCH on all resources that are used for new transmission and retransmission of the PSSCH, and $N_{symbol}^{DMRS}$ represents number of DMRS-OFDM symbols for the PSSCH.

The transmit terminal may directly or indirectly indicate a value of $t_{symbol,8}$ through a specific bit domain in the PSCCH2. Preferably, if the transmit terminal indirectly indicates the value of $t_{symbol,8}$, the value of $t_{symbol,8}$ can represent an offset relative to a specific reference value. The specific reference value may be number of OFDM symbols available for transmission of the PSSCH in a present PSSCH transmission slot, or number of OFDM symbols available for transmission of the PSSCH in a slot for that a present resource pool contains PSFCH resource configuration, or number of OFDM symbols available for transmission of the PSSCH in a slot for that the present resource pool does not contain the PSFCH resource configuration. In each transmission for the same transport block, the value of $t_{symbol,8}$ indicated in a corresponding PSCCH2 may be the same.

$N_{SC}^{PSCCH2,ref}$ represents number of actual REs that are used for carrying SCI format 0-2 in REs for the PSSCH, or number of reference REs that are configured by a high layer and used for carrying SCI format 0-2.

Preferably, if $N_{SC}^{PSCCH2,ref}$ represents the number of the actual REs that are used for carrying the SCI format 0-2 in the REs for the PSSCH, the transmit terminal ensures that a value of the MCS remains unchanged in new transmission and retransmission of the PSSCH.

In implementation nine, the number of the REs ($N_{RE}$) for the PSSCH may satisfy $$N_{RE}=N_{PRB} \times N_{SC}^{RB} \times t_{symbol,9}-N_{RE}^{PSCCH1}-N_{RE}^{DMRS,ref}-N_{RE}^{PSCCH2,ref}-N_{RPB} \times N_{oh}^{9}$$

$N_{PRB}$ represents number of PRBs for the PSSCH, $N_{SC}^{RB}$ represents number of subcarriers in a PRB, and $N_{RE}^{PSCCH1}$ represents number of REs for a first PSCCH that indicates transmission of the PSSCH.

$N_{oh}^{9}$ represents a value configured by a high layer. Preferably, a value of $N_{oh}^{9}$ is related with number of REs occupied by the CSI-RS and PT-RS presently transmitted together with the PSSCH. Optionally, $N_{oh}^{9}$ may be always 0.

$t_{symbol,9}$ represents number of reference OFDM symbols used for transmitting the PSSCH. Preferably, $t_{symbol,9}$ is a positive number, and 0<$t_{symbol,9}$<13.

In an implementation manner of the example, $t_{symbol,9}$ is determined by the physical layer of the transmit terminal according to a self-implementation manner, or determined by the high layer of the transmit terminal according to a self-implementation manner and indicated to the physical layer of the transmit terminal.

In another implementation manner of the example, $t_{symbol,9}$ is selected from a specific value range by the physical layer of the transmit terminal, and the specific value range is determined by configured signaling or pre-configured signaling.

In a further implementation manner of the example, the transmit terminal determines $t_{symbol,9}$ according to at least one of the following.

1. Number of OFDM symbols that are used for transmitting the PSSCH in a slot where a resource that is provided by the high layer of the terminal and is used for current transmission and/or retransmission of the PSSCH is located, where the OFDM symbols that are used for transmitting the PSSCH refer to any OFDM symbols containing REs that are available for transmitting the PSSCH, and the OFDM symbols that are used for transmitting the PSSCH do not include OFDM symbols used for the AGC.

2. Presently determined number of DMRS-OFDM symbols for the PSSCH, where the DMRS-OFDM symbols refer to any OFDM symbols containing the DMRS and do not include the OFDM symbols used for the AGC.

3. Presently determined number of REs occupied by PSCCH2.

For example, $t_{symbol,9} = \tilde{N}_{symbol}^{PSSCH}$, where $\tilde{N}_{symbol}^{PSSCH}$ represents an average value of number of OFDM symbols available for transmission of the PSSCH on all resources that are used for new transmission and retransmission of the PSSCH.

The transmit terminal may directly or indirectly indicate a value of $t_{symbol,9}$ through a specific bit domain in the PSCCH2. Preferably, if the transmit terminal indirectly indicates the value of $t_{symbol,9}$, the value of $t_{symbol,9}$ can represent an offset relative to a specific reference value. The specific reference value may be number of OFDM symbols available for transmission of the PSSCH in a present PSSCH transmission slot, or number of OFDM symbols available for transmission of the PSSCH in a slot for that a present resource pool contains PSFCH resource configuration, or number of OFDM symbols available for transmission of the PSSCH in a slot for that the present resource pool does not contain the PSFCH resource configuration. In each transmission for the same transport block, the value of $t_{symbol,9}$ indicated in a corresponding PSCCH2 may be the same.

$N_{SC}^{PSCCH2,ref}$ represents number of actual REs that are used for carrying SCI format 0-2 in the REs for the PSSCH, or number of reference REs that are configured by a high layer and used for carrying SCI format 0-2.

$N_{RE}^{DMRS,ref}$ represents number of actual REs that are used for carrying a reference signal in the REs for the PSSCH and determined according to a reference signal pattern actually adopted in initial transmission of the PSSCH. Preferably, in this case, the transmit terminal may directly or indirectly indicate the reference signal pattern actually adopted in the initial transmission of the PSSCH. Optionally, in this case, in new transmission and retransmission of the PSSCH, the transmit terminal ensures that the reference signal pattern actually adopted remains unchanged.

Alternatively, $N_{RE}^{DMRS,ref}$ represents number of REs that are used for carrying a reference signal in the REs for the PSSCH and determined according to a reference signal pattern self-selected by the transmit terminal. The reference signal pattern self-selected by the transmit terminal may be different from the reference signal pattern actually adopted. Preferably, in this case, the transmit terminal may directly or indirectly indicate through a specific bit domain the reference signal pattern self-selected by the transmit terminal.

Alternatively, $N_{RE}^{DMRS,ref}$ represents number of REs that are used for carrying a reference signal in the REs for the PSSCH and determined according to a reference signal pattern configured by configured signaling or pre-configured signaling. The reference signal pattern configured by the configured signaling or pre-configured signaling may be different from the reference signal pattern actually adopted.

For example, $$N_{RE}^{DMRS,ref} = N_{PRB} \times \frac{N_{sc}^{RB}}{2} \times N_{symbol}^{avr,DMRS},$$

$N_{symbol}^{avr,DMRS}$ is related to number of DMRS symbols allowed in a present resource pool, as illustrated in Table 1.

TABLE 1

| number of symbols for a DMRS pattern allowed in a present resource pool | $N_{symbol}^{avr,DMRS}$ |
|---|---|
| 2 | 2 |
| 3 | 3 |
| 4 | 4 |
| 2 or 3 | 2.5 |
| 2 or 4 | 3 |
| 3 or 4 | 3.5 |
| 2, 3, or 4 | 3 |

Optionally, $N_{symbol}^{avr,DMRS}$ is related to number of DMRS symbols available for SL transmission in the current resource pool, $$N_{RE}^{DMRS,ref} = N_{PRB} \times \frac{N_{sc}^{RB}}{2} \times N_{symbol}^{avr,DMRS} - \Delta,$$

$N_{symbol}^{avr,DMRS}$ is illustrated in Table 1, and a value of $\Delta$ is illustrated in Table 2.

TABLE 2

| $t_{symbol,9}$ | number of symbols for a DMRS pattern allowed in a present resource pool | $\Delta$ |
|---|---|---|
| 12 | 2 | 0 |
|  | 3 | $\dfrac{N_{RE}^{PSCCH1}}{2 \times N_{symbol}^{PSCCH}}$ |
|  | 4 | $\dfrac{N_{RE}^{PSCCH1}}{2 \times N_{symbol}^{PSCCH}}$ |
|  | 2 or 3 | $\dfrac{N_{RE}^{PSCCH1}}{4 \times N_{symbol}^{PSCCH}}$ |
|  | 2 or 4 | $\dfrac{N_{RE}^{PSCCH1}}{4 \times N_{symbol}^{PSCCH}}$ |
|  | 3 or 4 | $\dfrac{N_{RE}^{PSCCH1}}{2 \times N_{symbol}^{PSCCH}}$ |
|  | 2, 3, or 4 | $\dfrac{2 \times N_{RE}^{PSCCH1}}{6 \times N_{symbol}^{PSCCH}}$ |
| 11 | 2 | 0 |
|  | 3 | $\dfrac{N_{RE}^{PSCCH1}}{2 \times N_{symbol}^{PSCCH}}$ |

TABLE 2-continued

| $t_{symbol,9}$ | number of symbols for a DMRS pattern allowed in a present resource pool | Δ |
|---|---|---|
| | 4 | $\dfrac{N_{RE}^{PSCCH1}}{2 \times N_{symbol}^{PSCCH}}$ |
| | 2 or 3 | $\dfrac{N_{RE}^{PSCCH1}}{4 \times N_{symbol}^{PSCCH}}$ |
| | 2 or 4 | $\dfrac{N_{RE}^{PSCCH1}}{4 \times N_{symbol}^{PSCCH}}$ |
| | 3 or 4 | $\dfrac{N_{RE}^{PSCCH1}}{2 \times N_{symbol}^{PSCCH}}$ |
| | 2, 3, or 4 | $\dfrac{2 \times N_{RE}^{PSCCH1}}{6 \times N_{symbol}^{PSCCH}}$ |
| 10 | 2 | 0 |
| | 3 | $\dfrac{N_{RE}^{PSCCH1}}{2 \times N_{symbol}^{PSCCH}}$ |
| | 4 | $\dfrac{N_{RE}^{PSCCH1}}{2 \times N_{symbol}^{PSCCH}}$ |
| | 2 or 3 | $\dfrac{N_{RE}^{PSCCH1}}{4 \times N_{symbol}^{PSCCH}}$ |
| | 2 or 4 | $\dfrac{N_{RE}^{PSCCH1}}{4 \times N_{symbol}^{PSCCH}}$ |
| | 3 or 4 | $\dfrac{N_{RE}^{PSCCH1}}{2 \times N_{symbol}^{PSCCH}}$ |
| | 2, 3, or 4 | $\dfrac{2 \times N_{RE}^{PSCCH1}}{6 \times N_{symbol}^{PSCCH}}$ |
| 9 | 2 | 0 |
| | 3 | $\dfrac{N_{RE}^{PSCCH1}}{2 \times N_{symbol}^{PSCCH}}$ |
| | 2 or 3 | $\dfrac{N_{RE}^{PSCCH1}}{4 \times N_{symbol}^{PSCCH}}$ |
| 8 | 2 | 0 |
| | 3 | $\dfrac{N_{RE}^{PSCCH1}}{2 \times N_{symbol}^{PSCCH}}$ |
| | 2 or 3 | $\dfrac{N_{RE}^{PSCCH1}}{4 \times N_{symbol}^{PSCCH}}$ |
| 5, 6, or 7 | 2 | $\dfrac{N_{RE}^{PSCCH1}}{2 \times N_{symbol}^{PSCCH}}$ |

$N_{symbol}^{PSCCH}$ represents the number of the OFDM symbols used for the PSCCH1.

Optionally, $$N_{RE}^{DMRS,ref} = \dfrac{\sum_{i=0}^{A-1} N_{RE}^{DMRS,i}}{A},$$

A represents number of DMRS patterns allowed in the present resource pool, and $N_{RE}^{DMRS,i}$ represents number of REs occupied by a DMRS corresponding to an i-th DMRS pattern when the number of the symbols occupied by the PSSCH is supposed as $t_{symbol,9}$.

Preferably, if $N_{SC}^{PSCCH2,ref}$ represent the number of the actual REs that are used for carrying SCI format 0-2 in the REs for the PSSCH, the transmit terminal ensures that the value of the MCS remains unchanged in new transmission and retransmission of the PSSCH.

It can be understood that, the multiple formulas above are only examples, and the method in implementations of the disclosure is not limited to the formulas above. A part of parameters are optionally configured, for example, parameters $N_{oh}$ or β may not be configured.

After the terminal device determines the number of the REs for the PSSCH based on the method above, the terminal device determines the TBS for the PSSCH according to the number of the REs for the PSSCH.

For example, at 820, the terminal device determines the TBS for the PSSCH according to the number of the REs for the PSSCH as follows. The terminal device determines number of information bits according to the number of the REs for the PSSCH. The terminal device determines the TBS according to the number of the information bits.

The number of the information bits $N_{info}$ satisfies $N_{info}=N_{RE} \times R \times Q_m \times v$, where $N_{RE}$ represents the number of the REs for the PSSCH, R represents a transmission bit rate, $Q_m$ represents a modulation order, and v represents the number of the transmission layers.

Furthermore, the terminal device can quantify the number of the information bits $N_{info}$ and obtain quantified number of information bits $N_{info}'$, and determine the TBS for the PSSCH according to the quantified number of the information bits $N_{info}'$.

A process that the TBS is determined according to the number of the information bits may include several cases below.

In case 1: if the number of the information bits is less than or equal to a first threshold, i.e., $N_{info} \leq N_{thd1}$, the terminal device quantifies the number of the information bits and obtains quantified number of information bits $N_{info}'$. In a TBS table, the terminal device selects an integer not less than and closest to $N_{info}'$ as the TBS. The first threshold $N_{thd1}$ may be configured by the network device or pre-configured such as agreed by an agreement. For example, $N_{thd1}=3824$.

$N_{info}'=\max(24, 2^n \cdot \lfloor N_{info}/2^n \rfloor)$, where $n=\max(3, \lfloor \log_2 (N_{info}) \rfloor - 6)$.

For example, the TBS table is illustrated in Table 3. The terminal device can select a suitable TBS in the TBS table according to $N_{info}'$.

TABLE 3

| TBS index | TBS |
|---|---|
| 1 | 24 |
| 2 | 32 |
| 3 | 40 |
| 4 | 48 |

TABLE 3-continued

| TBS index | TBS |
|---|---|
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

In case 2: if the number of the information bits is greater than the first threshold, i.e., $N_{info} > N_{thd1}$, and the coding rate of the PSSCH is less than or equal to a second threshold, i.e., $R \leq R_{thd2}$, the terminal device quantifies $N_{info}$ and obtains $$N'_{info} : N'_{info} = \max\left(3840, 2^n \times \text{round}\left(\frac{N_{info} - 24}{2^n}\right)\right),$$

where $n = \lfloor \log_2(N_{info} - 24) \rfloor - 5$.

Furthermore $$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil.$$

In case 3: if the number of the information bits is greater than the first threshold, i.e., $N_{info} > N_{thd1}$, and the coding rate of the PSSCH is greater than the second threshold, i.e., $R > R_{thd2}$, the terminal device quantifies $N_{info}$ and obtains $$N'_{info} : N'_{info} = \max\left(3840, 2^n \times \text{round}\left(\frac{N_{info} - 24}{2^n}\right)\right),$$

where $n = \lfloor \log_2(N_{info} - 24) \rfloor - 5$.

If $$N'_{info} > 8424, TBS = 8 \cdot C \cdot \left\lceil \frac{N'_{info} + 24}{8 \cdot C} \right\rceil - 24, \text{ and } C = \left\lceil \frac{N'_{info} + 24}{8424} \right\rceil.$$

In other cases, $$TBS = 8 \cdot \left\lceil \frac{N'_{info} + 24}{8} \right\rceil - 24$$

It to be noted that, the above process for determining the TBS is applicable for initial transmission of the PSSCH. For example, the PSSCH uses an MCS Table illustrated in Table 4, and $0 \leq I_{MCS} \leq 27$. Optionally, the PSSCH uses other MCS Tables such as Table 5 and Table 6, and $0 \leq I_{MCS} \leq 28$.

TABLE 4

| MCS index $I_{MCS}$ | Modulation order Qm | Target coding rate R × [1024] | Spectrum efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | reserved |
| 29 | 4 | reserved | reserved |
| 30 | 6 | reserved | reserved |
| 31 | 8 | reserved | reserved |

TABLE 5

| MCS index $I_{MCS}$ | Modulation order Qm | Target coding rate R × [1024] | Spectrum efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 6 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | reserved |
| 30 | 4 | reserved | reserved |
| 31 | 6 | reserved | reserved |

TABLE 6

| MCS index $I_{MCS}$ | Modulation order Qm | Target coding rate R × [1024] | Spectrum efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | reserved |
| 30 | 4 | reserved | reserved |
| 31 | 6 | reserved | reserved |

In retransmission of the PSSCH, a TBS for retransmission of the PSSCH is the same as that for initial transmission of the PSSCH. For example, when Table 4 is used and $28 \leq I_{MCS} \leq 31$, or other MCS Tables are used and $29 \leq I_{MCS} \leq 31$, retransmitted data is carried in the PSSCH, and the TBS for retransmission of the PSSCH is that for the initial transmission.

When the number of the REs for the PSSCH is calculated with the method in implementations of the disclosure, an SL control channel, an SL feedback channel, an SL reference signal, a resource unavailable for SL transmission on a shared carrier, a resource overhead for comb mapping, and so on have been considered, therefore, a more accurate number of the REs for the PSSCH can be obtained, thereby accurately determining the TBS for the PSSCH.

It can be understood that, various implementations and/or technical features of the various implementations may be implemented in any combination with each other without conflict, and technical solutions thus obtained shall also fall within the protection cope of the disclosure.

In various implementations described herein, the magnitude of a sequence number of each process does not mean an order of execution, and the order of execution of each process should be determined by its function and an internal logic and shall not constitute any limitation to an implementation process of implementations.

The method for data transmission according to implementations of the disclosure is described in detail above. Apparatuses used in implementations of the disclosure will be described with FIGS. 9 to 11, and technical features described in the various method implementations are suitable for the following apparatus implementations.

Figure 9:
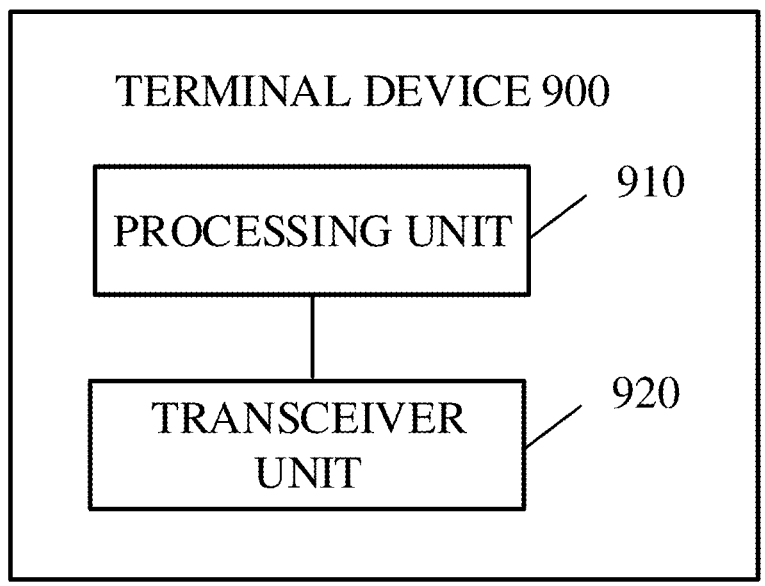
FIG. 9 is a schematic block diagram illustrating a terminal device in implementations of the disclosure.

FIG. 9 is a schematic block diagram illustrating a terminal device in implementations of the disclosure. In implementations illustrated in FIG. 9, the terminal device 900 includes a processing unit 910 and a transceiver unit 920.

The processing unit 910 is configured to determine number of REs for a PSSCH in a second resource according to a first resource used for transmitting a PSCCH and the second resource used for transmitting the PSSCH, where the first resource at least partially overlaps with the second resource. The processing unit 910 is further configured to determine a TBS for the PSSCH according to the number of the REs for the PSSCH.

Therefore, in SL transmission, when a transmission resource for the PSCCH overlaps with a transmission resource for the PSSCH indicated by the PSCCH, the number of the REs occupied by the PSSCH can be determined according to the transmission resource for the PSCCH and the transmission resource for the PSSCH, so that the TBS for the PSSCH can be accurately determined according to the number of the REs occupied by the PSSCH.

Optionally, the number of the REs for the PSSCH does not include number of REs in the first resource.

Optionally, the number of the REs for the PSSCH does not include at least one of: number of REs occupied by an SL reference signal, number of REs that are unavailable for SL transmission, number of REs occupied by a PSFCH, number of REs used as GPs, or number of REs used for AGC.

Optionally, the number of the REs for the PSSCH satisfies $N_{RE}=\beta(N_{PRB} \times N_{symb} \times N_{SC}^{RB} - N_{PSCCH}^{RE} - N_{RS}^{RE} - N_{oh})$, where $N_{PRB}$ represents number of PRBs for the PSSCH, $N_{symb}$ represents the number of time-domain symbols for the PSSCH, $N_{SC}^{RB}$ represents number of subcarriers in a PRB, $N_{PUSCCH}^{RE}$ represents number of REs occupied by the PSCCH in the second resource, NE represents the number of the REs occupied by the SL reference signal, $N_{oh}$ and $\beta$ are preset parameters, and $0<\beta<1$.

Optionally, $N_{oh}$ and $\beta$ are determined based on at least one of: the number of the REs occupied by the PSFCH, the number of the REs used as the GPs, the number of the REs used for the AGC, the number of the REs that are unavailable for SL transmission in the second resource, or the number of time-domain symbols that are unavailable for SL transmission in the second resource.

Optionally, the SL reference signal includes at least one of: a DMRS of the PSSCH, an SL CSI-RS, or a PT-RS.

Optionally, the REs in the first resource include REs occupied by the PSCCH and REs occupied by the DMRS of the PSCCH.

Optionally, the PSCCH includes a first PSCCH and a second PSCCH. The first PSCCH is used to indicate information used for resource sensing and first information, where the first information is used for determining the transmission resource for the second PSCCH. The second PSCCH is used to indicate information used for demodulating the PSSCH Optionally, the information used for resource sensing includes at least one of: information of the second resource, priority information of a service carried in the PSSCH, or information of a reserved resource of the terminal device.

Optionally, the first information includes at least one of: a format of the second PSCCH, an aggregation level of the second PSCCH, a size of a frequency-domain resource occupied by the second PSCCH, or number of time-domain symbols occupied by the second PSCCH.

Optionally, the information used for demodulating the PSSCH includes at least one of: an MCS, number of transmission layers, an HARQ process number, an NDI, or an ID. The ID includes at least one of: an ID of a transmit device, an ID of a receive device, a group ID of the receive device, or a service ID corresponding to the PSSCH.

Optionally, the terminal device is the receive device and further includes the transceiver unit 920. The transceiver unit 920 is configured to receive on the first resource the PSCCH transmitted by the transmit device, where the PSCCH is used for determining the second resource.

Optionally, the terminal device is the transmit device and further includes the transceiver unit 920. The transceiver unit 920 is configured to transmit on the first resource the PSCCH to the receive device, where the PSCCH is used for determining the second resource.

Optionally, the processing unit 910 is configured to determine number of information bits according to the number of the REs for the PSSCH, and determine the TBS according to the number of the information bits.

Optionally, the number of the information bits $N_{info}$ satisfies $N_{info}=N_{RE} \times R \times Q_m \times v$, where $N_{RE}$ represents the number of the REs for the PSSCH, R represents a transmission bit rate, $Q_m$ represents a modulation order, and v represents the number of the transmission layers.

Optionally, the processing unit 910 is configured to quantify the number of the information bits to obtain quantified number of information bits, and determine the TBS according to the quantified number of the information bits.

It can be understood that, the terminal device 900 can perform corresponding operations performed by the terminal device in methods illustrated in FIG. 8, which will not be repeated herein for the sake of simplicity.

Figure 10:
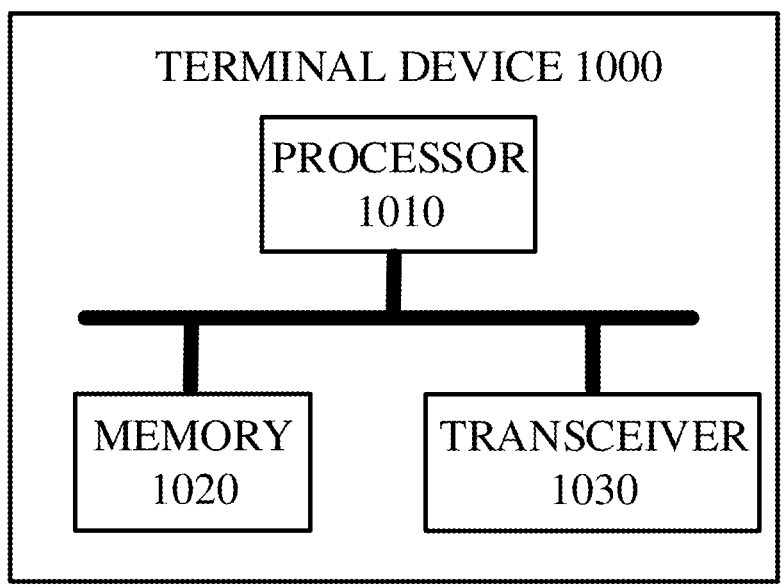
FIG. 10 is a schematic structural diagram illustrating a terminal device in implementations of the disclosure.

FIG. 10 is a schematic structural diagram illustrating a terminal device 1000 in implementations of the disclosure. The terminal device 1000 illustrated in FIG. 10 includes a processor 1010. The processor 1010 can be configured to invoke and execute computer programs stored in a memory, to perform the method in implementations of the disclosure.

Optionally, in implementations illustrated in FIG. 10, the terminal device 1000 further includes a memory 1020. The processor 1010 can be configured to invoke and execute computer programs stored in the memory 1020, to perform the method in implementations of the disclosure.

The memory 1020 may be a separate device from the processor 1010, or be integrated into the processor 1010.

Optionally, in implementations illustrated in FIG. 10, the terminal device 1000 further can include a transceiver 1030. The processor 1010 can control the transceiver 1030 to communicate with other devices. Specifically, the transceiver 1030 can be configured to transmit information or data to other devices or receive information or data transmitted by other devices.

The transceiver 1030 can include a transmitter and a receiver. Furthermore, the transceiver 1030 can include an antenna, and number of antennas can be one or more.

Figure 11:
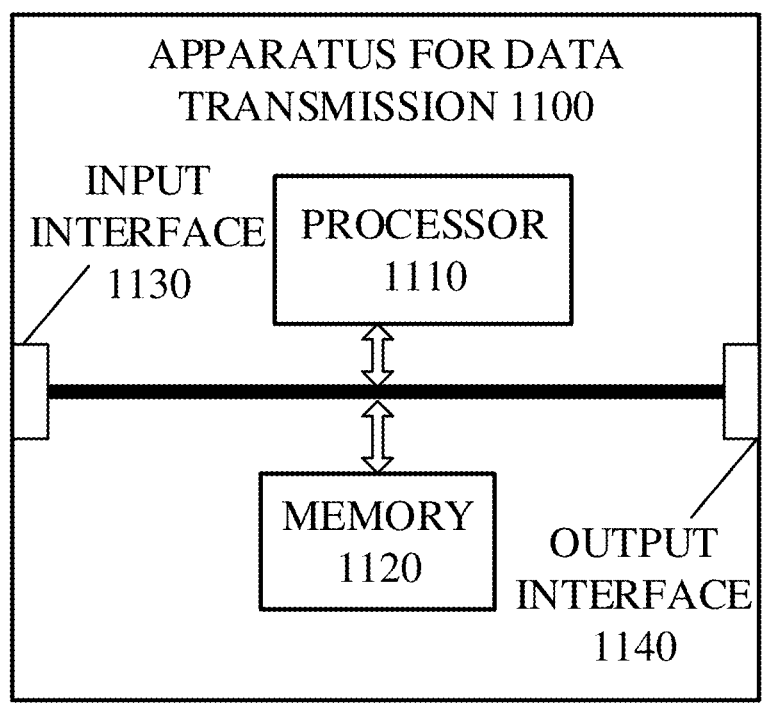
FIG. 11 is a schematic structural diagram illustrating an apparatus for data transmission in implementations of the disclosure.

FIG. 11 is a schematic structural diagram illustrating an apparatus for data transmission in implementations of the disclosure. The apparatus 1100 illustrated in FIG. 11 includes a processor 1110. The processor 1110 can be configured to invoke and execute computer programs stored in a memory, to perform the method in implementations of the disclosure.

Optionally, in implementations illustrated in FIG. 11, the apparatus 1100 further can include a memory 1120. The processor 1110 can be configured to invoke and execute computer programs stored in the memory 1120, to perform the method in implementations of the disclosure.

The memory 1120 may be a separate device from the processor 1110, or be integrated into the processor 1110.

Optionally, the apparatus 1100 further can include an input interface 1130. The processor 1110 can control the input interface 1130 to communicate with other devices or chips. For example, the input interface 1130 is configured to obtain information or data transmitted by other devices or chips.

Optionally, the apparatus 1100 further can include an output interface 1140. The processor 1110 can control the output interface 1140 to communicate with other devices or chips. For example, the output interface 1140 is configured to output information or data to other devices or chips.

Optionally, the apparatus 1100 can be applied to the terminal device in implementations of the disclosure, and the communication apparatus can implement a corresponding process implemented by the terminal device in each of methods in implementations of the disclosure, which will not be repeated herein for the sake of simplicity.

For example, the apparatus 1100 may be a chip. The chip may be a system-level chip, a system chip, a chip system, or a system-on-chip (SOC).

The processor in implementations of the disclosure may be an integrated circuit chip with signal processing capabilities. During implementation, each step of the foregoing method may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, or discrete hardware components. The methods, steps, and logic blocks disclosed in implementations of the disclosure can be implemented or executed. The general purpose processor may be a microprocessor, or the processor may be any conventional processor or the like. The steps of the method disclosed in implementations of the disclosure may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory and completes the steps of the above-mentioned method with the hardware thereof.

The memory in implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or a flash memory. The volatile memory may be a RAM that acts as an external cache. By way of example but not limitation, many forms of the RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM).

The above description of the memory is intended for illustration rather than limitation. For example, the memory in implementations of the disclosure may also be an SRAM, a DRAM, an SDRAM, a DDR SDRAM, an ESDRAM, an SLDRAM, a DR RAM, and so on. In other words, the memory in implementations of the disclosure is intended to include, but is not limited to, these and any other suitable types of memory.

A computer-readable storage medium is further provided in implementations of the disclosure. The computer-readable storage medium is configured to store computer programs. Optionally, the computer-readable storage medium may be applied to the terminal device in implementations of the disclosure. The computer programs enable a computer to implement a corresponding process performed by the terminal device in each of methods in implementations of the disclosure, which will not be repeated herein for the sake of simplicity.

A computer program product is further provided in implementations of the disclosure. The computer program product includes computer program instructions. Optionally, the computer program product may be applied to the terminal device in implementations of the disclosure, and the computer program instructions enable a computer to perform a corresponding process implemented by the terminal device in each of methods in implementations of the disclosure, which will not be repeated herein for the sake of simplicity.

A computer program is further provided in implementations of the disclosure. Optionally, the computer program may be applied to the terminal device in implementations of the disclosure, and the computer program, when run on a computer, enables the computer to perform a corresponding process implemented by the terminal device in each of methods in implementations of the disclosure, which will not be repeated herein for the sake of simplicity.

It can be understood that, the terms "system" and "network" in this disclosure are often used interchangeably. The term "and/or" in this disclosure is simply a description of the association relationship of associated objects, indicating that three relationships can exist, for example, A and/or B, which can indicate the existence of A alone, A and B together, and B alone. In addition, the character "/" in this disclosure generally indicates that associated objects are in an "or" relationship.

In this disclosure, "B corresponding to A" indicates that B is associated with A, and B is determined according to A. It can be understood that, B is determined according to A does not indicate that B is determined only according to A, B is also determined according to A and/or other information.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above-mentioned method implementations, which will not be repeated herein.

It will be appreciated that the systems, apparatuses, and methods disclosed in implementations herein may also be implemented in various other manners. For example, the above-mentioned apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

In addition, various functional units described in implementations herein may be integrated into one processing unit or may be present as a number of physically separated units, and two or more units may be integrated into one.

If the functions are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above-mentioned storage medium may include various kinds of media that can store program codes, such as a universal serial bus (USB) flash disk, a mobile hard drive, a ROM, a RAM, a magnetic disk, or an optical disk.

The above is only a specific implementation of the disclosure and is not intended to limit the scope of protection of the disclosure. Any modification, and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for determining transport block size for sidelink transmission, comprising:
   determining, by a terminal device, number of resource elements (REs) for a physical sidelink shared channel (PSSCH) in a second resource according to a first resource used for transmitting a physical sidelink control channel (PSCCH) and the second resource indicated by the PSCCH and used for transmitting the PSSCH, the first resource at least partially overlapping with the second resource; and
   determining, by the terminal device, a transport block size (TBS) for the PSSCH according to the number of the REs for the PSSCH;
   wherein determining, by the terminal device, the TBS for the PSSCH according to the number of the REs for the PSSCH comprises:
   determining, by the terminal device, number of information bits according to the number of the REs for the PSSCH; and
   determining, by the terminal device, the TBS according to the number of the information bits, wherein the number of the information bits satisfies $N_{info} = N_{RE} \times R \times Q_m \times v$, $N_{RE}$ represents the number of the REs for the PSSCH, R represents a transmission bit rate, $Q_m$ represents a modulation order, and v represents number of transmission layers;
   wherein determining, by the terminal device, the TBS according to the number of the information bits comprises:
   obtaining, by the terminal device, quantified number of information bits by quantifying the number of the information bits; and
   determining, by the terminal device, the TBS according to the quantified number of the information bits.

2. The method of claim 1, wherein the REs for the PSSCH do not comprise REs in the first resource.

3. The method of claim 2, wherein the REs for the PSSCH further do not comprise at least one of:
   REs occupied by a sidelink (SL) reference signal;
   REs unavailable for SL transmission;
   REs occupied by a physical sidelink feedback channel (PSFCH);
   REs used as guard periods (GPs); or
   REs used for automatic gain control (AGC).

4. The method of claim 3, wherein the number of the REs for the PSSCH satisfies $$N_{RE} = N_{PRB} \times N_{SC}^{RB} \times N_{symbol}^{PSSCH} - NP_{RE}^{PSCCH1} - N_{RE}^{PSCCH2} - N_{SC}^{DMRS} - N_{oh}^3$$

wherein $N_{PRB}$ represents number of physical resource blocks (PRBs) for the PSSCH, $N_{SC}^{RB}$ represents number of subcarriers in a PRB, $N_{symbol}^{PSSCH}$ represents number of orthogonal frequency division multiplexing (OFDM) symbols allocated for transmission of the PSSCH in a present slot; $N_{RE}^{PSCCH1} = F_{RB}^{PSCCH1} \times T_{symbol}^{PSCCH1} \times N_{SC}^{RB}$, $N_{RE}^{PSCCH1}$ represents number of REs for a first PSCCH, $F_{RB}^{PSCCH1}$ represents number of PRBs used for transmitting the first PSCCH, $T_{symbol}^{PSCCH1}$ represents number of OFDM symbols used for transmitting the first PSCCH, $N_{RE}^{PSCCH2}$ represents number of REs for transmission of a second PSCCH, $N_{SC}^{DMRS}$ represents number of REs that are used for carrying a demodulation reference signal (DMRS) of the PSSCH; and
wherein $N_{oh}^3$ is determined based on $N_{oh}^3 = N_{PRB} \times N_{oh}^{resourcepool}$, and $N_{oh}^{resourcepool}$ is indicated by configured signaling or pre-configured signaling of a resource pool.

5. The method of claim 3, wherein the number of the REs for the PSSCH satisfies $$N_{RE} = N_{PRB} \times N_{SC}^{RB} \times t_{symbol,8} - N_{RE}^{PSCCH1} - N_{RE}^{PSCCH2,ref} - N_{PRB} \times N_{oh}^8$$

$N_{PRB}$ represents number of PRBs for the PSSCH, $N_{SC}^{RB}$ represents number of subcarriers in a PRB, $N_{RE}^{PSCCH1}$ represents number of REs for a first PSCCH, $N_{oh}^8$ represents a value configured by a high layer, $t_{symbol,8}$ represents number of reference OFDM symbols used for transmitting the PSSCH, and $t_{symbol,8}$ is determined according to number of OFDM symbols that are used for transmitting the PSSCH in a slot where a resource used for current transmission and/or retransmission of the PSSCH is located.

6. The method of claim 3, wherein the number of the REs for the PSSCH satisfies $$N_{RE} = N_{PRB} \times N_{SC}^{RB} \times t_{symbol,9} - N_{RE}^{PSCCH1} - N_{RE}^{DMRS,ref} - N_{RE}^{PSCCH2,ref} - N_{PRB} \times N_{oh}^9$$

$N_{PRB}$ represents number of PRBs for the PSSCH, $N_{SC}^{VRB}$ represents number of subcarriers in a PRB, $N_{RE}^{PSCCH1}$ represents number of REs for a first PSCCH, $N_{RE}^{DMRS,ref}$ represents number of REs for carrying a reference signal, $N_{RE}^{PSCCH2,ref}$ represents number of REs for carrying sidelink control information (SCI) format 0-2, $N_{oh}^9$ represents a value configured by a high layer, $t_{symbol,9}$ represents number of reference OFDM symbols used for transmitting the PSSCH, and $t_{symbol,9}$ is determined according to number of OFDM symbols that are used for transmitting the PSSCH in a slot where a resource used for current transmission and/or retransmission of the PSSCH is located.

7. The method of claim 3, wherein the SL reference signal comprises a DMRS of the PSSCH.

8. The method of claim 1, wherein the REs in the first resource comprise the REs occupied by the PSCCH and the REs occupied by a DMRS of the PSCCH.

9. The method of claim 1, wherein the PSCCH comprises a first PSCCH and a second PSCCH, wherein
the first PSCCH is used to indicate information used for resource sensing and first information, wherein the first information is used for determining a transmission resource for the second PSCCH; and
the second PSCCH is used to indicate information used for demodulating the PSSCH.

10. The method of claim 9, wherein the information used for resource sensing comprises at least one of:
information of the second resource;
priority information of a service carried in the PSSCH; or
information of a reserved resource of the terminal device.

11. The method of claim 9, wherein the first information comprises at least one of:
a format of the second PSCCH;
an aggregation level of the second PSCCH;
a size of a frequency-domain resource occupied by the second PSCCH; or
number of time-domain symbols occupied by the second PSCCH.

12. The method of claim 9, wherein the information used for demodulating the PSSCH comprises at least one of:
a modulation and coding scheme (MCS);
number of transmission layers;
a hybrid automatic repeat request (HARQ) process number;
a new data indicator (NDI); or
an identifier (ID), wherein the ID comprises at least one of: an ID of a transmit device, an ID of a receive device, a group ID of the receive device, or a service ID corresponding to the PSSCH.

13. The method of claim 1, wherein the terminal device is a receive device, and the method further comprises:
receiving on the first resource, by the terminal device, the PSCCH transmitted by a transmit device, wherein the PSCCH is used for determining the second resource.

14. The method of claim 1, wherein the terminal device is a transmit device, and the method further comprises:
transmitting on the first resource, by the terminal device, the PSCCH to a receive device, wherein the PSCCH is used for determining the second resource.

15. A terminal device, comprising:
a processor; and
a memory storing a computer program;
the computer program being executed by the processor to cause the terminal device to:
determine number of resource elements (REs) occupied by a physical sidelink shared channel (PSSCH) in a second resource according to a first resource used for transmitting a physical sidelink control channel (PSCCH) and the second resource indicated by the PSCCH and used for transmitting the PSSCH, the first resource at least partially overlapping with the second resource; and
determine a transport block size (TBS) for the PSSCH according to the number of the REs for the PSSCH;
wherein the computer program executed by the processor to cause the terminal device to determine the TBS for the PSSCH according to the number of the REs for the PSSCH is executed by the processor to cause the terminal device to:
determine number of information bits according to the number of the REs for the PSSCH; and
determine the TBS according to the number of the information bits, wherein the number of the information bits satisfies $N_{info}=N_{RE} \times R \times Q_m \times v$, $N_{RE}$ represents the number of the REs for the PSSCH, R represents a transmission bit rate, $Q_m$ represents a modulation order, and v represents number of transmission layers;
wherein the computer program executed by the processor to cause the terminal device to determine the TBS according to the number of the information bits is executed by the processor to cause the terminal device to:
obtain quantified number of information bits by quantifying the number of the information bits; and
determine the TBS according to the quantified number of the information bits.

16. The terminal device of claim 15, wherein the number of the REs for the PSSCH does not comprise number of REs in the first resource.

17. The terminal device of claim 16, wherein the number of the REs for the PSSCH further does not comprise at least one of:
number of REs occupied by a sidelink (SL) reference signal;
number of REs that are unavailable for SL transmission;
number of REs occupied by a physical sidelink feedback channel (PSFCH);
number of REs used as guard periods (GPs); or number of REs used for automatic gain control (AGC).

18. The terminal device of claim 17, wherein the number of the REs for the PSSCH satisfies $$N_{RE}=N_{PRB} \times N_{SC}^{RB} \times N_{symbol}^{PSSCH}-N_{RE}^{PSCCH1}-N_{SC}^{DMRS}-N_{oh}^3$$

wherein $N_{PRB}$ represents number of physical resource blocks (PRBs) for the PSSCH, $N_{SC}^{RB}$ represents number of subcarriers in a PRB, $N_{symbol}^{PSSCH}$ symbol represents number of orthogonal frequency division multiplexing (OFDM) symbols allocated for transmission of the PSSCH in a present slot;
$N_{RE}^{PSCCH1}=R_{RB}^{PSCCH1} \times T_{symbol}^{PSCCH1} \times N_{SC}^{RB}$,
$N_{RE}^{PSCCH1}$ represents number of REs for a first PSCCH, $F_{RB}^{PSCCH1}$ represents number of PRBs used for transmitting the first PSCCH, $T_{symbol}^{PSCCH1}$ represents number of OFDM symbols used for transmitting the first PSCCH, $N_{RE}^{PSCCH2}$ represents number of REs for transmission of a second PSCCH, $N_{sc}^{DMRS}$ represents number of REs that are used for carrying a demodulation reference signal (DMRS) of the PSSCH; and
wherein $N_{oh}^3$ is determined based on $N_{oh}^3=N_{PRB} \times N_{oh}^{resourcepool}$, and $N_{oh}^{resourcepool}$ is indicated by configured signaling or pre-configured signaling of a resource pool.

19. The terminal device of claim 17, wherein the number of the REs for the PSSCH satisfies $$N_{RE}=N_{PRB}\times N_{SC}^{RB}\times t_{symbol,8}-N_{RE}^{PSCCH1}-N_{RE}^{PSCCH2,ref}-N_{PRB}\times N_{oh}^{8}$$

$N_{PRB}$ represents number of PRBs for the PSSCH, $N_{SC}^{RB}$ represents number of subcarriers in a PRB, $N_{RE}^{PSCCH1}$ represents number of REs for a first PSCCH, $N_{SC}^{RB}$ represents a value configured by a high layer, $t_{symbol,8}$ represents number of reference OFDM symbols used for transmitting the PSSCH, and $t_{symbol,8}$ is determined according to number of OFDM symbols that are used for transmitting the PSSCH in a slot where a resource used for current transmission and/or retransmission of the PSSCH is located.

20. The terminal device of claim 17, wherein the number of the REs for the PSSCH satisfies $$N_{RE}=N_{PRB}\times N_{SC}^{RB}\times t_{symbol,9}-N_{Re}^{PSCCH1}-N_{RE}^{DMRS,ref}-N_{RE}^{PSCCH2,ref}-N_{PRB}\times N_{oh}^{9}$$

$N_{PRB}$ represents number of PRBs for the PSSCH, $N_{SC}^{RB}$ represents number of subcarriers in a PRB, $N_{RB}^{PSCCH1}$ represents number of REs for a first PSCCH, $N_{RE}^{DMRS,ref}$ represents number of REs for carrying a reference signal, $N_{RE}^{PSCCH2,ref}$ represents number of REs for carrying sidelink control information (SCI) format 0-2, $N_{oh}^{9}$ represents a value configured by a high layer, $t_{symbol,9}$ represents number of reference OFDM symbols used for transmitting the PSSCH, and $t_{symbol,9}$ is determined according to number of OFDM symbols that are used for transmitting the PSSCH in a slot where a resource used for current transmission and/or retransmission of the PSSCH is located.

* * * * *